United States Patent
Dhanani

(10) Patent No.: US 8,032,940 B1
(45) Date of Patent: Oct. 4, 2011

(54) METHOD AND SYSTEM FOR GENERATING AND EMPLOYING A SECURE INTEGRATED DEVELOPMENT ENVIRONMENT

(75) Inventor: Ashif A. Dhanani, Louisville, CO (US)

(73) Assignee: Chaperon, LLC, Louisville, CO (US)

( * ) Notice: Subject to any disclaimer, the term of this patent is extended or adjusted under 35 U.S.C. 154(b) by 975 days.

(21) Appl. No.: 11/977,388

(22) Filed: Oct. 23, 2007

Related U.S. Application Data

(60) Provisional application No. 60/854,262, filed on Oct. 25, 2006.

(51) Int. Cl.
G06F 21/00 (2006.01)

(52) U.S. Cl. .......................................... 726/26; 713/191

(58) Field of Classification Search ........................ None
See application file for complete search history.

(56) References Cited

U.S. PATENT DOCUMENTS

| | | | |
|---|---|---|---|
| 6,405,364 B1 * | 6/2002 | Bowman-Amuah | 717/101 |
| 6,684,389 B1 * | 1/2004 | Tanaka et al. | 717/140 |
| 2001/0044894 A1 * | 11/2001 | Saito et al. | 713/156 |
| 2001/0052072 A1 * | 12/2001 | Jung | 713/160 |
| 2003/0200454 A1 * | 10/2003 | Foster et al. | 713/200 |
| 2004/0216052 A1 * | 10/2004 | Methot | 715/705 |
| 2005/0102673 A1 * | 5/2005 | DeWitt et al. | 718/100 |
| 2005/0273859 A1 * | 12/2005 | Chess et al. | 726/25 |

* cited by examiner

*Primary Examiner* — Minh Dinh
*Assistant Examiner* — David Le
(74) *Attorney, Agent, or Firm* — Blakley, Sokoloff, Taylor & Zafman LLP

(57) ABSTRACT

A system and method are provided to generate a secure integrated development environment (IDE). In one embodiment, a plurality of modules in a source code associated with a conventional IDE is detected. One or more modules of the plurality of modules that are to be modified are identified. One or more modifying components are identified and are to be associated with the one or more modules that are to be modified. A secure IDE is generated by updating the conventional IDE by modifying the one or more modules in the source code associated with the conventional IDE, wherein the one or more modules are modified by associating the one or more modifying components to the corresponding one or more modules.

25 Claims, 18 Drawing Sheets

METHOD AND SYSTEM FOR GENERATING AND EMPLOYING A SECURE INTEGRATED DEVELOPMENT ENVIRONMENT

CROSS-REFERENCE TO RELATED APPLICATION

This application claims priority to U.S. Provisional Application No. 60/854,262, entitled SECURE INTEGRATED DEVELOPMENT ENVIRONMENT, filed Oct. 25, 2006.

FIELD

The embodiments of the present invention are generally directed to a secure software application, and more particularly to creating a secure integrated development environment (IDE).

BACKGROUND

An IDE, also known as integrated design environment and integrated debugging environment, is a type of computer software that assists computer programmers to develop software. IDEs typically have a source code editor, a compiler and/or interpreter, build-automation tools and a debugger. Sometimes a version control system and various tools that simplify the construction of a GUI are integrated as well. Many IDEs also integrate a class browser, an object inspector, and a class hierarchy diagram for use with object oriented software development. Although some multiple-language IDEs are in use, typically an IDE is devoted to building software using a specific programming language. In the past, the source code for most IDEs was not published and deemed proprietary to the company owning the IDE. However, of late, IDEs that support development of software in multiple languages are available. Some of these multi-language IDEs are also open sourced so that they can be enhanced and maintained by a community of developers rather than a single corporation. Examples of multi-language open source IDEs include Eclipse and NetBeans.

Typically, a software developer pulls up the IDE at a desktop at a company's facility or dials in from a remote location over a secure or unsecure connection. The developer then writes code using the IDE, such as Java® NetBeans. The NetBeans IDE is an open-source integrated development environment written entirely in Java® using the NetBeans Platform. Currently, it is relatively easy for the developer or third party to steal code from the system running the integrated development environment by simply making a copy of the source Code by use of the network or removable media. In the present environment, it is difficult to detect such a security breach of the company's trade secrets and intellectual property (IP), the reason being that it is virtually impossible to differentiate an attempt to access the source code for legitimate reasons, i.e., software development, from an attempt to access the source code with the intent to pirate it.

There are several current practices that attempt to protect IP from theft. A developer may use a computer without a universal serial bus (USB) connection or disk drive and no external network connection to prevent copying. A project may also be split into different pieces at different locations, so that no single employee has access to the complete code base. Biometric and fingerprinting techniques may be used to track what employees are doing. Code-tracking like digital watermarking techniques may be used to track copies. However, available techniques do not provide fast automated transparent cost effective protection at the root while also protecting the source code at all times without a dependency on physical protections and without loss of developer productivity.

For example, FIG. 1 illustrates a prior art software development environment and areas of source code vulnerability. The software development environment 100 includes an corporate wide area network (corporate area) 102 includes a couple of subnets, such as an on-site development area 104 and an off-shore development area 106 in communication with each other, having a number of components, as illustrated. The corporate area 102 is also shown to be in communication with an out sourced development area 108 and a home work area 110 along with a mobile user 112. However, given this conventional software development environment 100, the corporate area 102 represents potential points of source code vulnerability to an unauthorized user (e.g., thief) 114 waiting to cause the unwanted and expensive damage.

In view of the foregoing, it may be useful to provide methods and systems that address the aforementioned and other difficulties. Other limitations of the conventional systems will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

A system and method are provided to generate a secure integrated development environment (IDE). In one embodiment, a plurality of modules in a source code associated with a conventional IDE is detected. One or more modules of the plurality of modules that are to be modified are identified. One or more modifying components are identified and are to be associated with the one or more modules that are to be modified. A secure IDE is generated by updating the conventional IDE by modifying the one or more modules in the source code associated with the conventional IDE, wherein the one or more modules are modified by associating the one or more modifying components to the corresponding one or more modules.

In one embodiment, a secure IDE is provided that allows a company to protect its intellectual property (IP) from an internal or external security breach. In one embodiment, among other things, a secured cut, copy and paste, a disabled file print, a disabled Hypertext Markup Language (HTML) export and print and fast transparent encryption/decryption of source code to/from. Such operations are typically embodied within a control module subsystem that provides security extensions to the IDE, where the control module has a number of instructions thereon for performing the steps on a computer.

In one embodiment, intrusion detection and alarm generation algorithms that use call origin analysis in addition to caller identity checking are used to secure sensitive Java® encryption/decryption methods from intruders who may assume a trusted identity. In addition, the intruder may be given a response of success so that information relating to the intruder may be logged without suspicion. In another embodiment, the encryption/decryption process is performed automatically. In yet another embodiment, the ant build target is implemented in a secure fashion without sacrificing reusability and extensibility by implementing the core encryption/decryption logic in Java® technology and wrapping this encryption/decryption logic with an ant target where the ant target and the Java® code live in separate files on the file system.

Accordingly, the developer is given read-only permissions on the ant target and the underlying Java® classes are hidden from the developer.

In addition to the exemplary aspects and embodiments described above, further aspects and embodiments will become apparent by reference to the drawings and by study of the following descriptions. Furthermore, these exemplary aspects and embodiments may be implemented using a computer program, a method, a system, an apparatus, or any combination thereof. These and other details of one or more embodiments of the invention are set forth in the accompanying drawings and in the description below.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one. Furthermore, a better understanding of the present invention can be obtained from the following detailed description in conjunction with the following drawings, in which.

DETAILED DESCRIPTION

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts.

In one embodiment, any source code vulnerabilities of a software development environment can be greatly reduced (if not entirely eliminated) using an embodiment of a secure IDE of the present invention. Throughout this document, various embodiments are discussed that provide for a secure IDE. In one embodiment, source code developed using the secure IDE is protected at all times, e.g., during transporting, building process, passive storing on disk, performing back-ups on the network, etc. Advantageously, the secure IDE works well with off-shore software developments, multi-site corporations, flexible workforces (e.g., contractors, temps, consultants, etc.), work-from-home employees, etc. Embodiments of the present invention provide for a full featured, secure IDE that presents a well-known and familiar user interface to the experienced user and therefore requires no additional training costs to the company, among other benefits.

Figure 1:
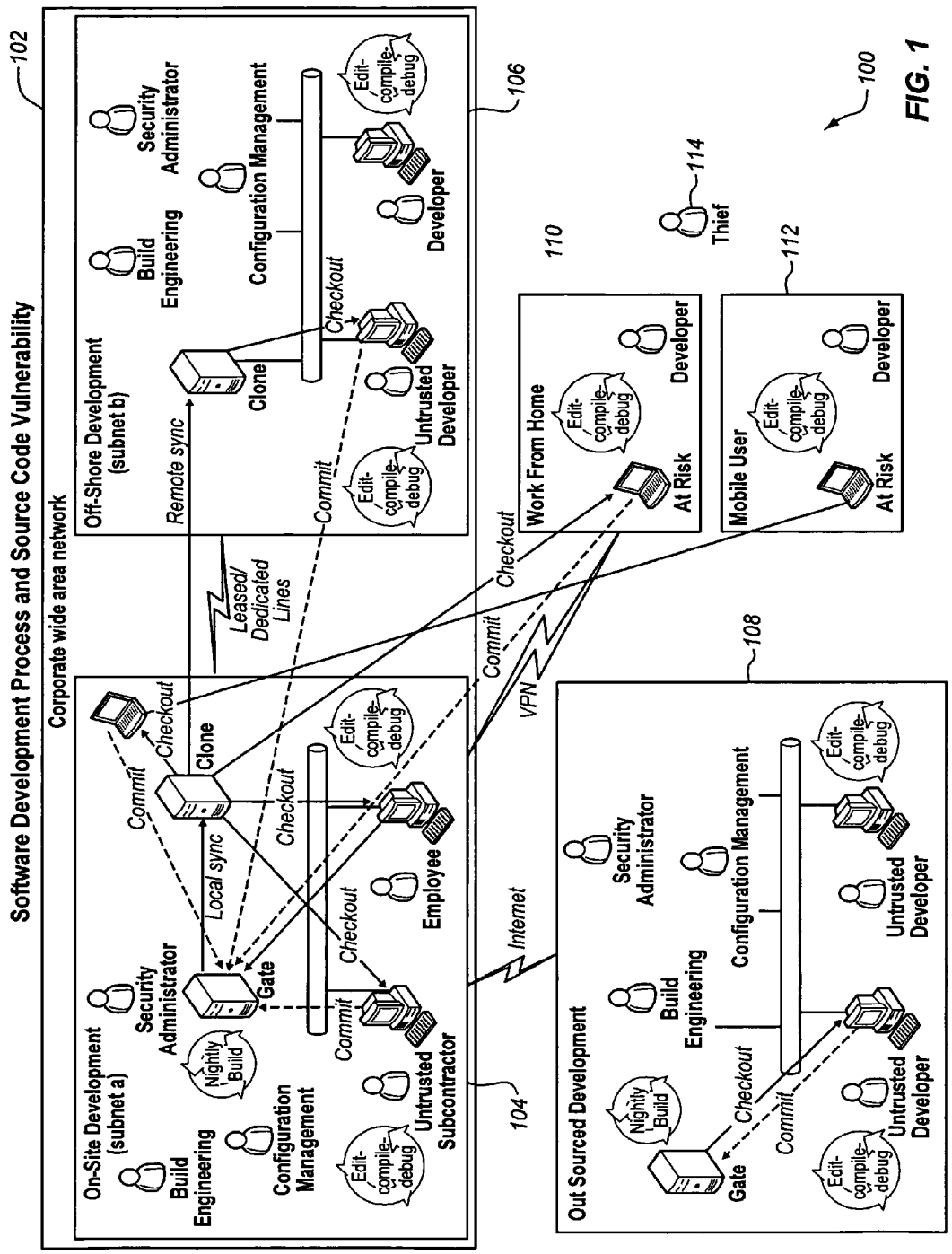
FIG. 1 illustrates a prior art software development environment and areas of source code vulnerability.
Figure 2:
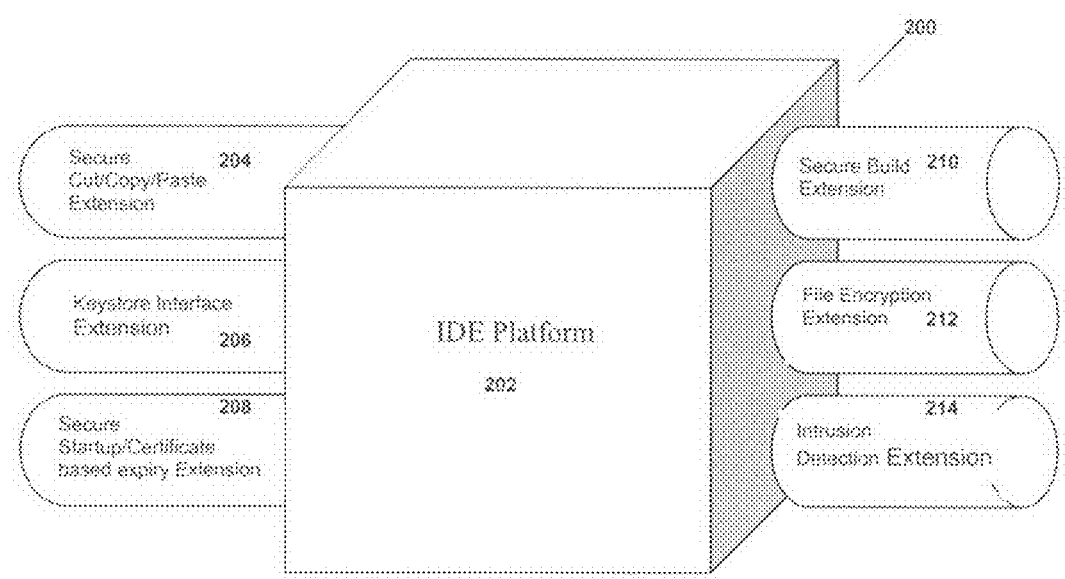
FIG. 2 illustrates an embodiment of an IDE platform having a placement of control module security extensions to provide a secure.

FIG. 2 illustrates an embodiment of an IDE platform 202 having a placement of control module security extensions 204-214 to provide a secure IDE 200. In one embodiment, various novel components (e.g., security extensions 204-214) of a secure IDE 200 are illustrated and these novel security extensions 204-214 of the IDE platform 202 of FIG. 2 are packaged and installed as a part of secure IDE installation 300 of FIG. 3 to provide a secure IDE 200 (e.g., Chaperon secure IDE) having novel components/security extensions 204-214 (e.g., Chaperon components/security extensions). For example, a conventional IDE platform 202 in combination with novel (Chaperon) security extensions 204-214 provide for a novel (Chaperon) secure IDE 200. An IDE platform 202 refers to a platform or framework upon which an IDE can be based. An example of an IDE platform 202 includes a Java® IDE platform. The IDE platform 202 may include any number of such IDE platforms. The illustrated embodiment of the IDE platform 202 provides various novel security extensions 204-214 to facilitate creating and providing an embodiment of a secure IDE 200. The security extensions 204-214 are shown to be in communication with each other via the IDE platform 202. In one embodiment, a regular or conventional or off-the-shelf IDE is adopted and then by employing and using the security extensions 204-214, the conventional IDE is transformed into a secure IDE 200 that provides the security and functionalities that the conventional IDE cannot provide.

A novel secure cut/copy/past security extension 204 is employed to ensure that any text that is copied or cut from an external application (e.g., Microsoft® Word) is pasted into the editor window of the IDE, while any text cut or copied from that particular editor window of the IDE may not be pasted into an external application. However, the text may be pasted into another editor window within the IDE. A novel keystore interface security extension 206 of the IDE platform 202 is used to enable the IDE to communicate with (e.g., read and write from) with other keystore objects or components (e.g., Java keystore) that represent an in-memory collection of keys and certificates.

A novel secure startup certificate based expiry security extension (startup/expiry extension) 208 is employed to be used to prompt a user (e.g., developer, administrator, etc.) for a password when the IDE is started up. The startup/expiry extension 208 is further to check the expiry date in the certificate that is stored, such as in the certstore, and that the expiry date has not passed. A novel secure build extension 210 of the IDE platform 202 is used to run secure ant build scripts to ensure that the source code remains encrypted during the developer build process. A secure ant build may be used to produce IDE project files for the IDE.

A novel file encryption/decryption security extension 212 is employed at the IDE platform 202 to decrypt and encrypt the source code when it is read from and written back to a disk, respectively. The IDE platform 202 employs a novel intrusion detection security extension 214 to generate security alert events when a developer attempts to write code that accesses sensitive encryption/decryption login embedded in other extensions, including other security extensions 204-212. Each of the security extensions 204-214 provides for the secure IDE 200 and, it is contemplated, that these extensions 204-214 may be used in any number of combinations and for a variety of functions. For example, one or more of the security extensions 204-214 may not be used and, in contrast, one or more additional security extensions (not illustrated) may be employed to achieve the secure IDE 200. Similarly, the functionalities of the security extensions 204-214 may be adjusted or even swapped as desired or necessitated.

Figure 3:
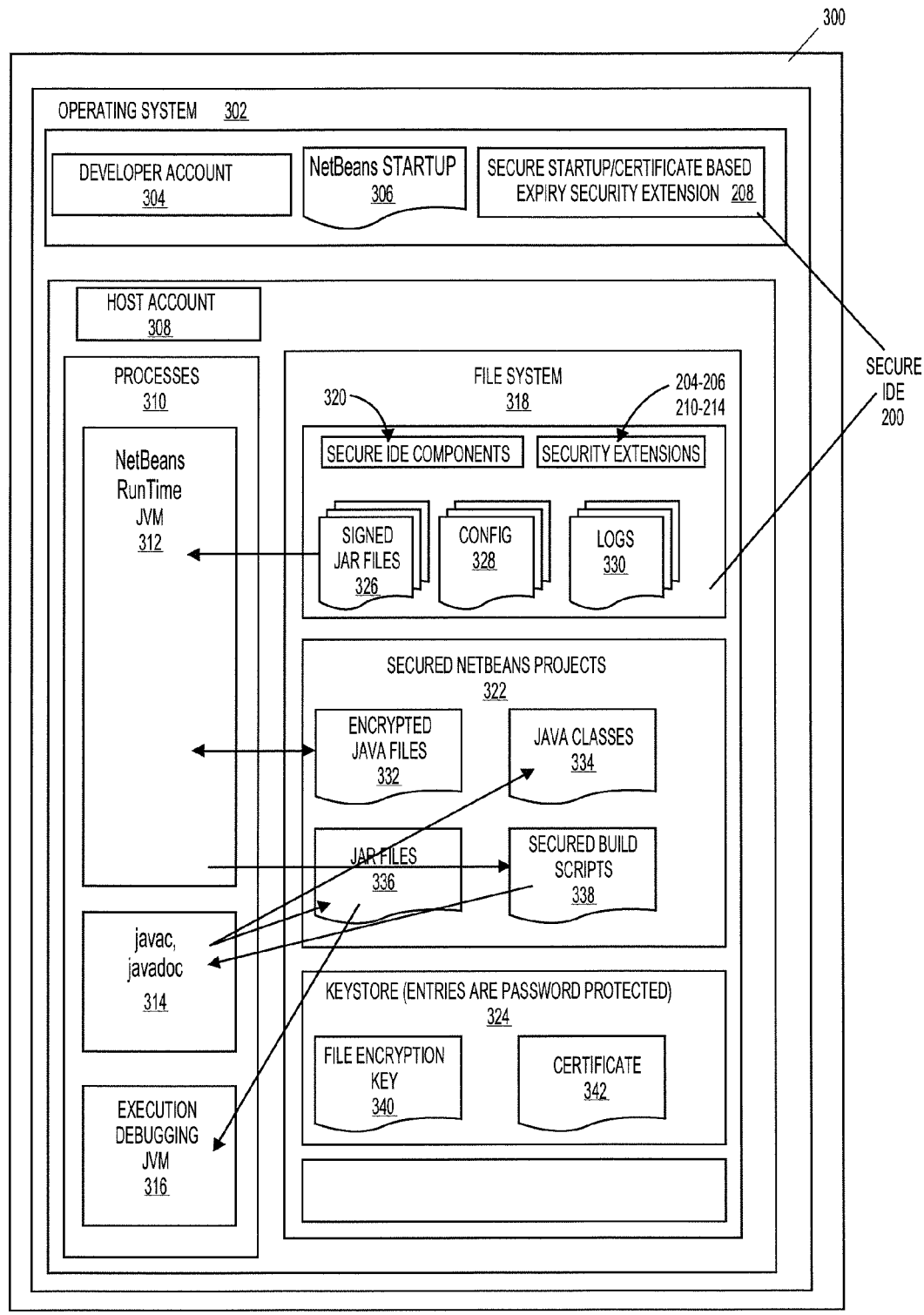
FIG. 3 illustrates an embodiment of a secure IDE installation to provide an embodiment of a secure.

FIG. 3 illustrates an embodiment of a secure IDE installation 300 to provide an embodiment of a secure IDE 200. The secure IDE installation 300, as illustrated, employs embodiments of the presentation invention, such as novel security extensions 204-214 of the IDE platform 202 of FIG. 2. In the illustrated embodiment, secure IDE components 320, including security extensions 204-206, 210-214, are installed at a file system 318 of a host account 308, while the novel secure startup/certificate based expiry security extension 208 is shown as being installed on a developer account 304. The security extensions 204-206, 210-214 of the secure IDE components 320 when combined with the security extension 208 represent an embodiment of the secure IDE 200 of FIG. 2.

In one embodiment, a user/developer is kept isolated from the secure IDE installation 300 (such as from the developer account 304) to secure projects comprising the source code that is being developed using the secure IDE 200 and other components, such as the keystore, to securely store encryption keys. To provide additional security, no developer is allowed to access the secure IDE 200 and various other underlying sensitive artifacts without having a valid identity, such as the ownership identify of the secure IDE 200 with valid login and/or password associated with the owner of the secure IDE 200 at the time when executing an IDE startup script.

In one embodiment, the secure IDE 200 provides a fast, automated, transparent, and cost effective IDE at the root, while also protecting the source code at all times without depending upon physical protections and without any loss of developer productivity. The illustrated embodiment of the secure IDE installation 300 includes an operating system 302 (e.g., Microsoft® XP) where the secure IDE 200 resides. The operating system 302 may further include virtual machines (VM) (e.g., Java® virtual machines (JVM)) where part or all of the secure IDE 200 may reside and run various operating system processes, such as processes 310. The operating system 302 includes a developer account 304 (e.g., Chaperon developer account) and a host account 308 (e.g., Chaperon host account). The host account 308 further includes a file system 318 and various processes 310.

The developer account 304 includes NetBean startup 306 is used to access the secure IDE 200. This is performed by a user logging into the developer account 304 and running the host account 308 as a designated user (e.g., Chaperon user) via the secure startup/certificate based expiry security extension 208. The developer account setup includes a configuration process at the operating system 302 that is performed once by a system administrator prior to installing the host account 308. Further, the startup/expiry extension 208 is further to check the expiry date in the certificate that is stored in a certificate store and ensuring that the expiry date is still valid and has not past.

In one embodiment, the host account 308, the developer account 304, and components of the secure IDE 200 at these accounts 304, 308 are installed on and compatible with the operating system 302. It is contemplated that the secure IDE 200 is not limited to a particular operating system and that is compatible with any number of operating systems as well as computer systems. The secure IDE 200 is secure and can be used and accessed by merely those users that have the permission and proper validation, and therefore permission to have produce binaries and user ID and/or password, etc., to use, access, and run the secure IDE 200 via the developer and host accounts 304, 308. For example, access of the secure IDE 200 may remain login disabled by the operating system 302, but it can be used by a user (e.g., developer, system administrator, etc.) who is an individual user or is employed by a company that has permission to have product binaries (e.g., Chaperon product binaries) and the necessary user ID and/or password to access the secure IDE 200 by accessing the host account 308 via the developer account 304. The setup for the secure IDE 200 can be performed via a configuration process at the operating system 302, which can be done once by a system administrator prior to installing various components of the secure IDE 200.

As illustrated, the host account 308 includes various processes 310 and a file system 318 that includes the secure IDE components 320, secure NetBeans projects 322; and keystore 324. The processes 310 include various operating system processes that are run from time to time when a user is actively using the secure IDE 200. Any software programs that are developed using the secure IDE 200 may be tested in a separate VM so that they remain isolated from the main VM running and/or hosting the secure IDE 200. In the illustrated embodiment, the processes 310 are shown as having various processes and/or components, such as NetBeans Runtime JVM 312, javac/javacloc 314, and execution debugging JVM 316. The arrows in FIG. 3 illustrate various parts of the file system 318 that are accessed by each running process of the processes 310.

In one embodiment, the file system 318 includes the secure IDE components 320 include security extensions 204-206, 210-214, secure NetBeans projects 322, and keystore (that is entries and password protected) 324. The file system 318 and its contents or resources may be protected using protection systems, such as file system Access Control Lists (or ACLs), that ensure that no unauthorized parties or users can access sensitive information on the file system 318 whether the secure IDE 200 is running or not. Furthermore, the secure IDE components 320 include signed jar files 326, configuration files 328, and log files 330. Similarly, the secured Net- Beans projects 322 are shown to include encrypted Java® files 332, Java® classes 334, jar files 336, and secured build scripts 338 while the keystore 324 includes file encryption key 340 and certificate 342.

Figure 4:
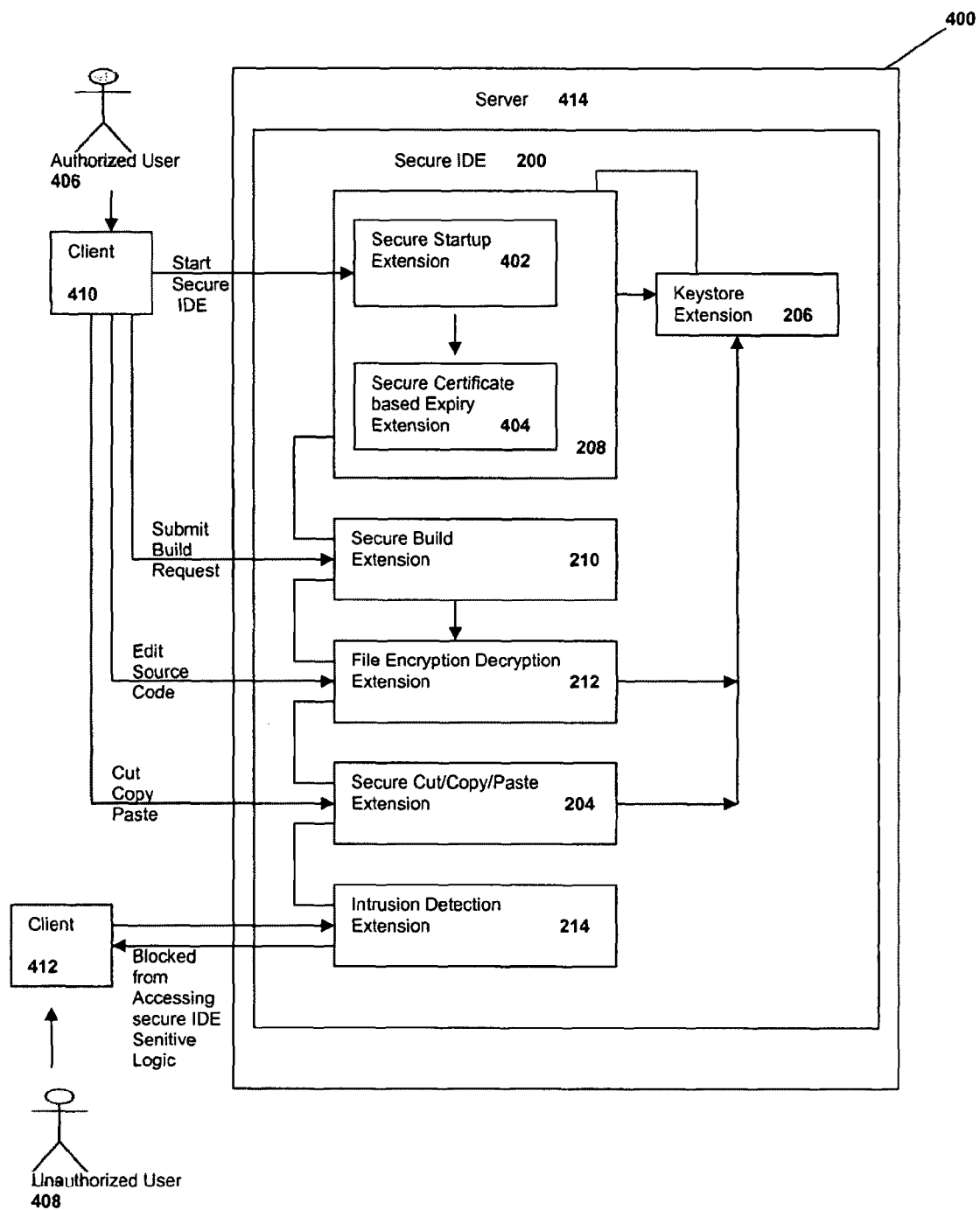
FIG. 4 illustrates an embodiment of a mechanism to access and use a secure IDE.

FIG. 4 illustrates an embodiment of a mechanism, 400 to access and use a secure IDE 200. In one embodiment, the secure IDE 200 having security extensions 204-214 resides at server 414. An authorized user 406 represents a user that processes permission to access and use the secure IDE 200 and has the necessary credentials (e.g., valid user ID, password, etc.) to access and use the secure IDE 200. The authorized user 406 may access the secure IDE 200 at the server 414 via a client 410. Clients 410, 412 include any computer system that is in communication with the server 414, which also represents a computer system. The authorized user 406, via the client 410, accesses secure startup extension 402 of the startup/expiry extension 208, which also includes secure certificate based expiry extension 404. Furthermore, the authorized user may submit build request via the secure build extension 210 of the secure IDE 200. Similarly, the authorized user may edit source code via the file encryption/decryption extension 212, and cut, copy and/or paste parts of the source code via the secure cut/copy/paste extension 204 of the secure IDE 200. In one embodiment, if an unauthorized user 408 (e.g., a user without proper credentials and permission to access the secure IDE 200), via a client 412, makes an attempt to access the secure IDE 200, the intrusion detection extension 214 blocks the unauthorized user 408 from accessing the secure IDE 200 or any other relevant sensitive logic or components.

Figure 5:
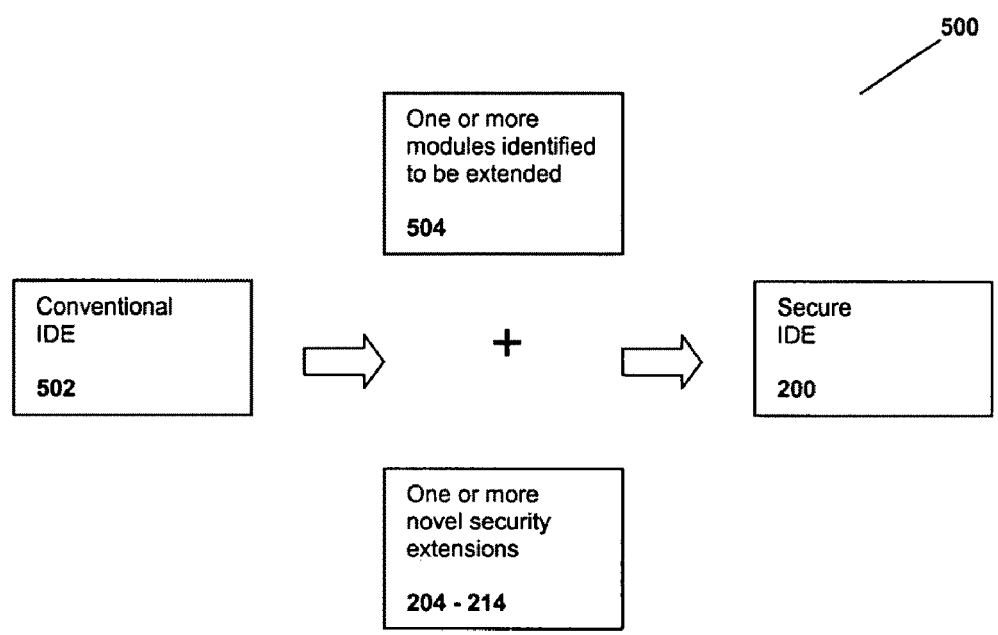
FIG. 5 illustrates an embodiment of a mechanism to generate a secure IDE.

FIG. 5 illustrates an embodiment of a mechanism 500 to generate a secure IDE 200. In one embodiment, source code for a conventional IDE 502 is downloaded. Any modules 504 that are to be modified or extended are identified. One or more appropriate novel security extensions 204-214 are used to modify or extend the one or more identified modules 504 resulting generating an embodiment of the secure IDE 200. The process if further described in FIG. 6.

Figure 6:
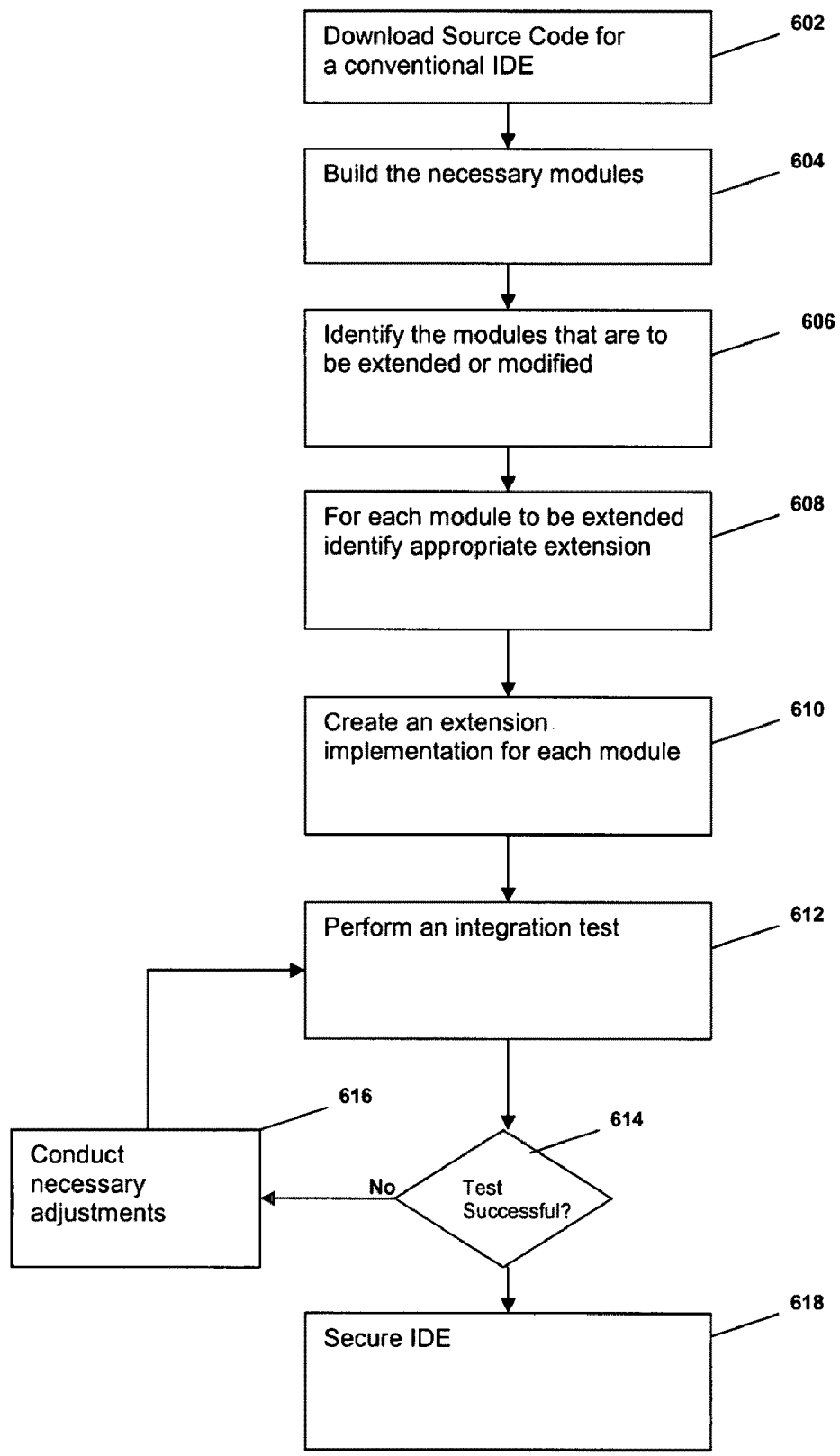
FIG. 6 illustrates an embodiment of a process to generate a secure IDE.

FIG. 6 illustrates an embodiment of a process to generate a secure IDE. In one embodiment, a secure IDE is generated and implemented using various one or more novel security extensions as illustrated in preceding FIGS. 2 and 3. At processing block 602, source code for a conventional IDE is downloaded. At processing block 604, necessary modules of the conventional IDE are built. Then, one or more such modules of the conventional IDE are identified that are to be extended or modified at processing block 606. At processing block 608, an appropriate security extension is identified for each of the one or more modules that are to be extended. At processing block 610, an extension module implementation for each such module is crated. For example, a conventional edit module is extended into a secure edit module, such as the novel secure cut/copy/pate security extension. Similarly, other modules may be extended and modified using a number of novel security extensions.

In one embodiment, an integration test is performed at processing block 610. The integration test is performed to ensure that the extensions of the modules are performed properly. At decision block 612, a determination is made as to whether the integration test was successful. If the integration test was successful, a secure IDE is established at processing block 618. If the integration test is unsuccessful, necessary adjustments to the process and/or the modules are conducted at processing block 616. After the adjustments, the process continues with the running of the integration test at processing block 612.

In, one embodiment, a secure IDE is generated by adding one or more secure components (e.g., security extensions) to one or more existing components of a conventional IDE with a view to restrict access to and of the source code that is actively created and manipulated within the IDE to only the authorized users. This is further to secure the source code from theft by allowing only the authorized users and/or authorized third-party users to access and use the secure IDE without requiring a significant change to the existing software development methodologies and with minimum runtime performance overhead that is imperceptible to the IDE user.

Figure 7:
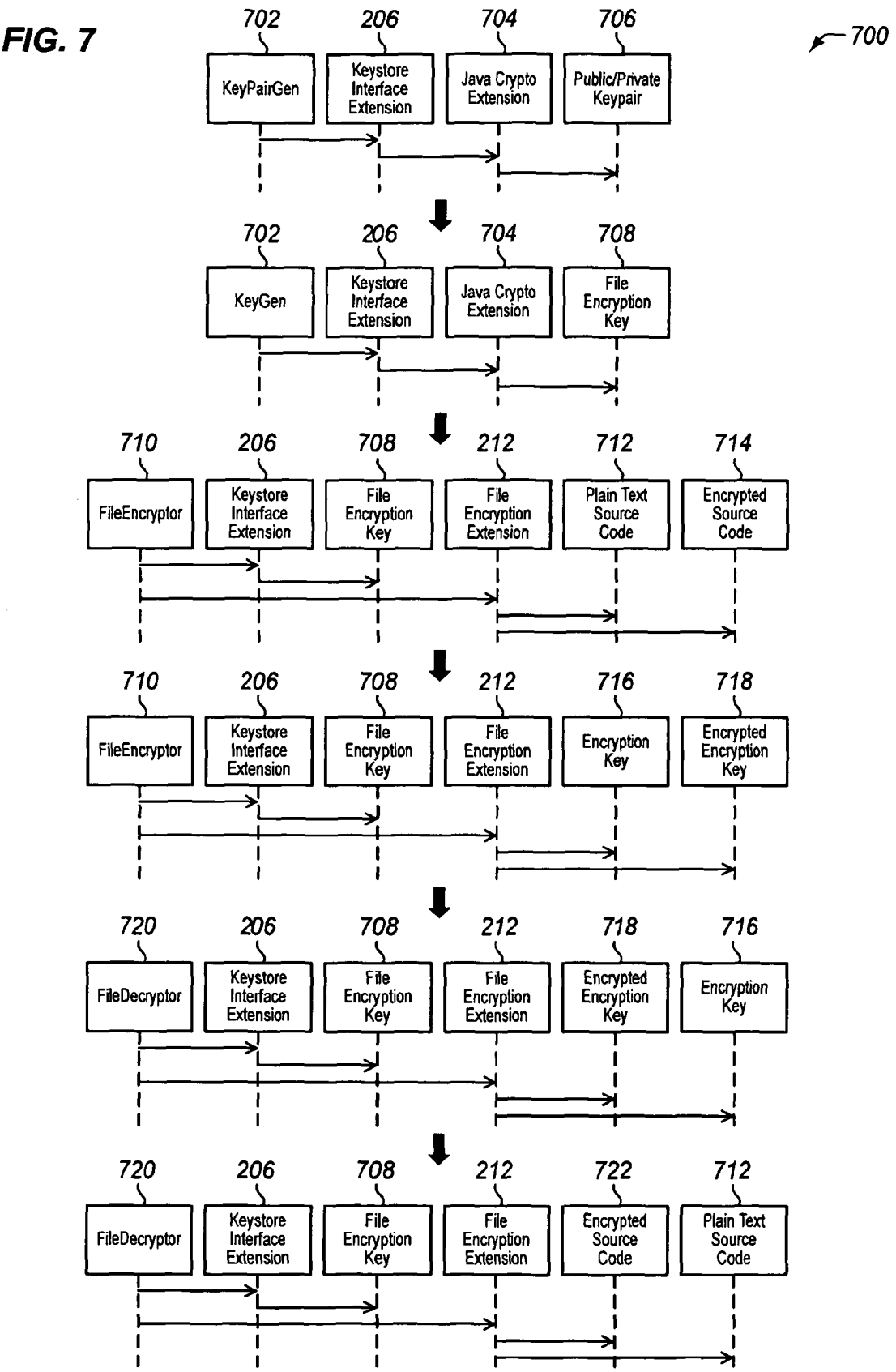
FIG. 7 illustrates an embodiment of a mechanism to securely transfer sensitive source code over an unsecured network.

FIG. 7 illustrates an embodiment of a mechanism 700 to securely transfer sensitive source code over an unsecured network. In one embodiment, using the mechanism 700, secure transfer of sensitive source code over an unsecured network is performed. As illustrated, a novel key pair generator 702, in communication with a novel keystore interface security extension 206 and Java® crypto extensions, 704, generates a public/private key pair 706 (having a public key and a private key). The key pair generator 702 includes a module or a utility program to generate file encryption keys 708 and is part of the novel file encryption extension 212 of a secure IDE. The generation of the public/private key pair 706 may be performed at a remote location (e.g., off-shore development center). The key pair generator 702 is further in communication with the keystore interface extension 206 and Java® crypto extensions 704 to generate a file encryption key 708. The generation of the file encryption key 708 may be performed by user/owner at a host computer system. Furthermore, a novel file encrypter 710 is used to encrypt the plain text source code 712 into an encrypted source code 714 further using the keystore interface extension 206, the file encryption key 708, and the file encryption extension 212. The novel component of file encrypter 710 and the file decryptor 720 are part of the novel file encryption extension 212 of a secure IDE.

The encryption key 716 is then encrypted into an encrypted encryption key 718 using the public key of the file encryption key 708 via the novel file encrypter 710, the novel keystore interface extension 206, and the novel file encryption extension 212. The procedure can be performed at a host location. Using a novel file decryptor 720 that is in communication with the novel keystore extension 206 and the novel file encryption extension 212 and the private key of the file encryption key 708, the encrypted encryption key 718 is decrypted into the encryption key 716. Finally, the novel file decryptor 720 and the novel keystore extension 206 along with the file encryption key 708 and the novel file encryption extension 212 are used to decrypt the encrypted source code 722 into the plain text source code 712. These final processes may be performed at a remote location which is communication with the host location via a network (e.g., Internet, intranet, Wide Area Network (WAN), Local. Area Network (LAN), Metropolitan Area Network (MAN), etc.) which may include an unsecured network. The process is further described with reference to FIG. 8.

Figure 8:
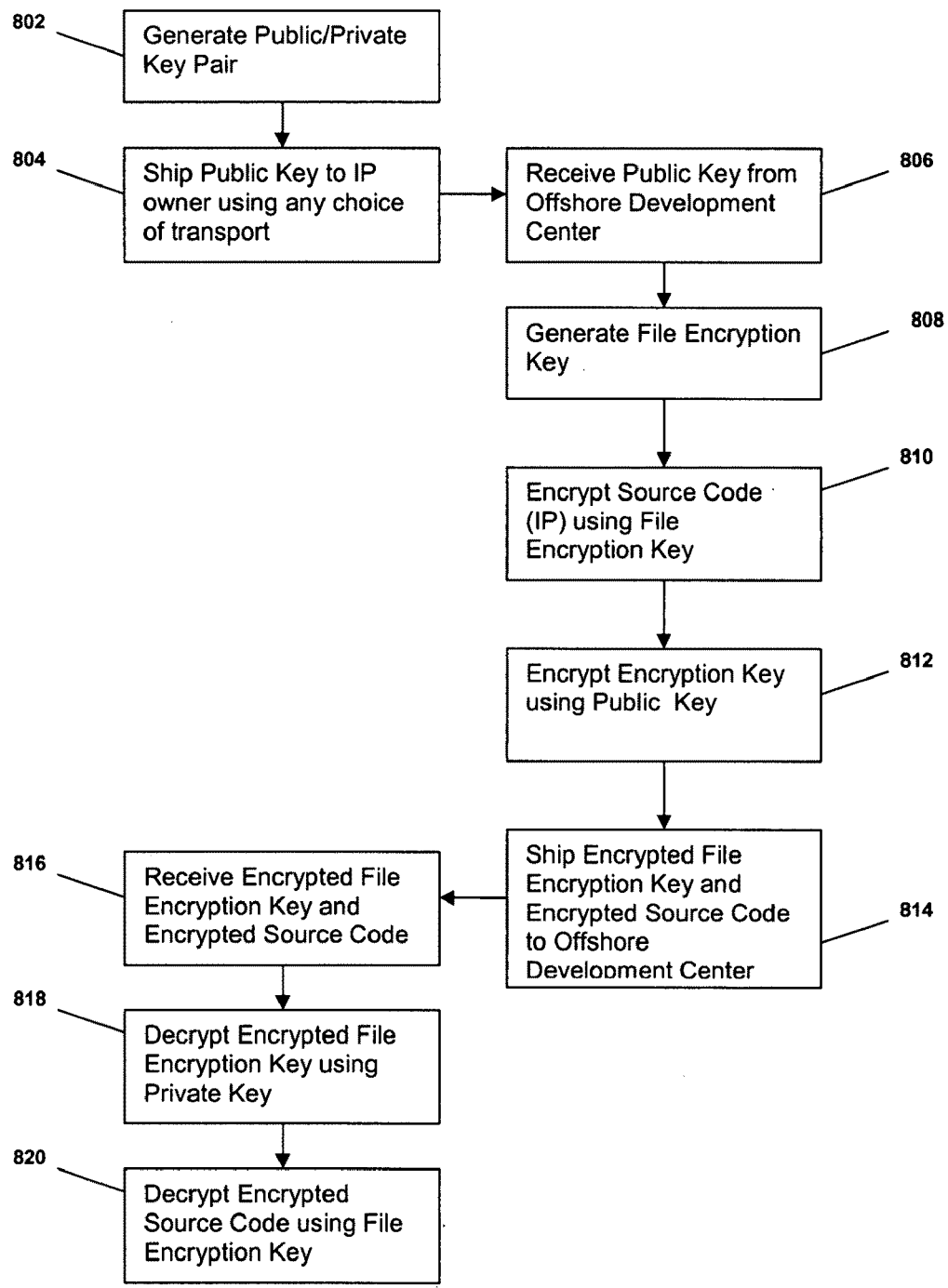
FIG. 8 illustrates an embodiment of a process to securely transfer sensitive source code over an unsecured network.

FIG. 8 illustrates an embodiment of a process to securely transfer sensitive source code over an unsecured network. In one embodiment, sensitive source code is securely transferred over an unsecured network. At processing block 802, a pair of keys including a public key and a private key is generated at an offshore development center (center). At processing block 804, the public key is communicated to an owner using any number of communication mechanisms. The public key is received at processing block 806, and a file encryption key is generated at processing block 808. The source code is then encrypted using the file encryption key at processing block 810, and the encryption key is then encrypted using the public key at processing block 812. The encrypted file encryption key and the encrypted source code are then communicated back to the center at processing block 814. The encrypted file encryption key and the encrypted source code are received at the center at processing block 816. The encrypted file encryption key is then decrypted using the private key at processing block 818. At processing block 820, the source encrypted source code is then decrypted using the file encryption key. A novel component of key pair generator may be used to generate the file encryption key. A key pair generator may include a module or a utility program, which may be a part of a file encryption extension of a secure IDE.

In one embodiment, a secure transferring of sensitive source code over an unsecured network is performed. A public/private key pair is generated at a first location, wherein the pubic/private key pair includes a public key and a private key. The public key is then transmitted to a second location. At the second location, an encryption key is generated, and the source code is encrypted using the encryption key, and the encryption key is encrypted using the public key. The encrypted encryption key and the encrypted source code are transmitted to the first location. At the first location, the encrypted encryption key and the encrypted source code are received. The encrypted encryption key is decrypted using the private key, and encrypted source code is decrypted using the encryption key at the first location.

Intrusion Detection Using Stack Trace Analysis

Figure 9:
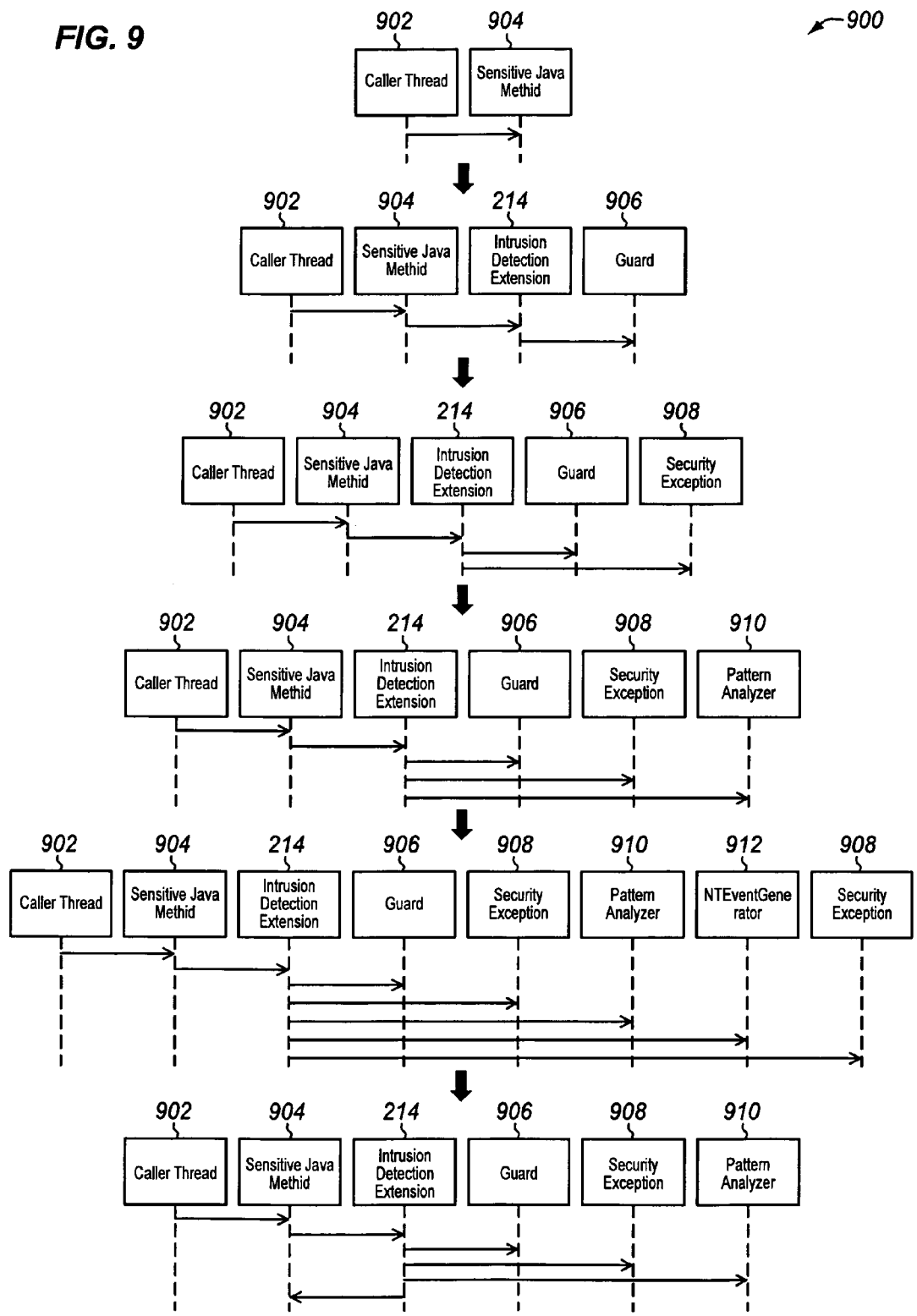
FIG. 9 illustrates an embodiment of a mechanism to detect security intrusion in a method.

FIG. 9 illustrates an embodiment of a mechanism 900 to detect security intrusion in a method. In one embodiment, the mechanism 900 is used to detect security intrusion in a method. In one embodiment, the detection of security intrusion is performed using a novel intrusion detection extension 214 to prevent an authorized user (e.g., unintentional unauthorized user, malicious unauthorized user, etc.) for accessing and using the secure IDE. An authorized user refers to a user (e.g., developer, system administrator, etc.) who does not have the permission or authority or valid credentials (e.g., ownership, user ID, password, etc.) to access or use the secure IDE. For example, an incoming call from a caller thread 902 is received at a method 904. An example of the method includes a (sensitive) Java method, which is used here as an example for brevity and clarity. A guard 906 associated with the method 904 intercepts the call using the novel intrusion detection security extension 214. The guard 906 in the method 904 determines a stack trace of the incoming call using the intrusion detection extension 214 and a security exception 908. The guard 906 of the method 904 seeks proprietary patterns that identify an authorized caller by examining the stack trace using a novel pattern analyzer 910 along with the instruction detection extension 214 and the security exception 908. Once the pattern is determined to be valid, the guard 906 logs the caller details, and generates a security alert event via an even generator 912 (e.g. NTEventGenerator), and throws a security exception 908 back to the caller 902 using the intrusion detection extension and the pattern analyzer. If the pattern is determined to be not valid, the guard 906 permits the call associated with the sensitive Java method 904 to proceed, which is performed using the novel intrusion detection extension 214, the security exception 908, and the pattern analyzer 910. The patent analyzer 910 may include a component or module that takes a stack trace as input and matches it with well-known patterns of authorized callers. This process being performed using the mechanism 900 to detect security intrusion in a method is further described with reference to FIG. 10.

Figure 10:
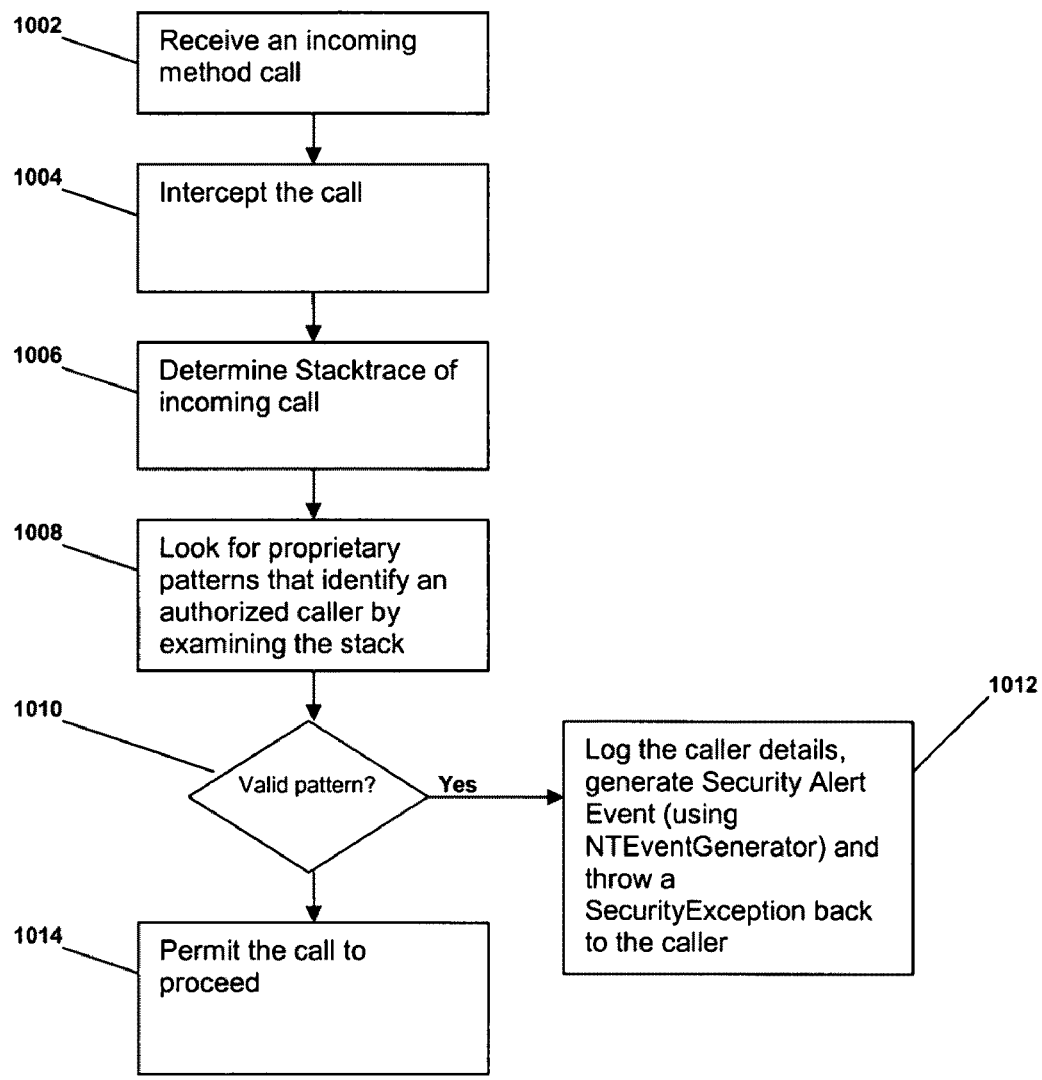
FIG. 10 illustrates an embodiment of a process to detect security intrusion in a method.

FIG. 10 illustrates an embodiment of a process to detect security intrusion in a method. In one embodiment, detection of security intrusion in a method is performed. The method may include a Java® method, such as a sensitive Java® method. Using the (sensitive) Java® method as an example, an incoming call is received at the (sensitive) Java® method at processing block 1002. A guard in the method intercepts the call at processing block 1004, and the guard in the method determines the stack trace of the incoming call at processing block 1006. At processing block 1008, the guard in the method seeks proprietary patterns that identify an authorized caller by examining the stack trace. At decision block 1010, a determination is made as to whether the pattern is valid. If the pattern is valid, the guard logs the caller details, and generates a security alert event and throws a security exception back to the caller at processing block 1012. If the pattern is not valid, the guard permits the call to proceed at processing block 1014.

In one embodiment, security intrusion is detected in a method (e.g., Java® method) that performs an encryption operation and/or decryption operation. The detection of security intrusion includes generating and analyzing stack trace information to help detect intruders and raise security alarms and events. For example, when a Java® method needs to perform sensitive operations and hence needs to accept or deny an incoming call, it needs to be able to determine not just the identity of the caller but also the origin of the call. The origin is defined as the identity of the object that made the call and its predecessors and successors in the call chain. The reason the Java® method requires both the origin of the call and the caller identity is to solve for the case where the call originator impersonates a trusted caller by assuming the identity of the trusted caller. By including the call origin analysis in the decision making process, the Java® method is able to filter out impersonators and unauthorized users. If the technique that is used to specify and determine call origination is made secret to the Java® method and the trusted originator objects, then the Java® method can use that secret to reliably filter out calls from callers that it does not trust. In one embodiment, this technique is performed using the novel intrusion detection security extension in communication with other novel secure IDE extensions and components as well as various conventional components. In one embodiment, stack trace analysis may be used to implement embodiments of the present invention in Java®. Intrusion detection is further strengthened by not indicating to the un-trusted caller that a security violation occurred but instead returning it a bogus value so as to fake a successful call and at the same time logging the fact that an intrusion may have occurred. This may be implemented in specific signed jar files at a file system that comprises a secured IDE installation having various secure IDE components, including the novel intrusion detection security extension, as illustrated in FIG. 3.

Secure Streams Based Encryption Process

Figure 11:
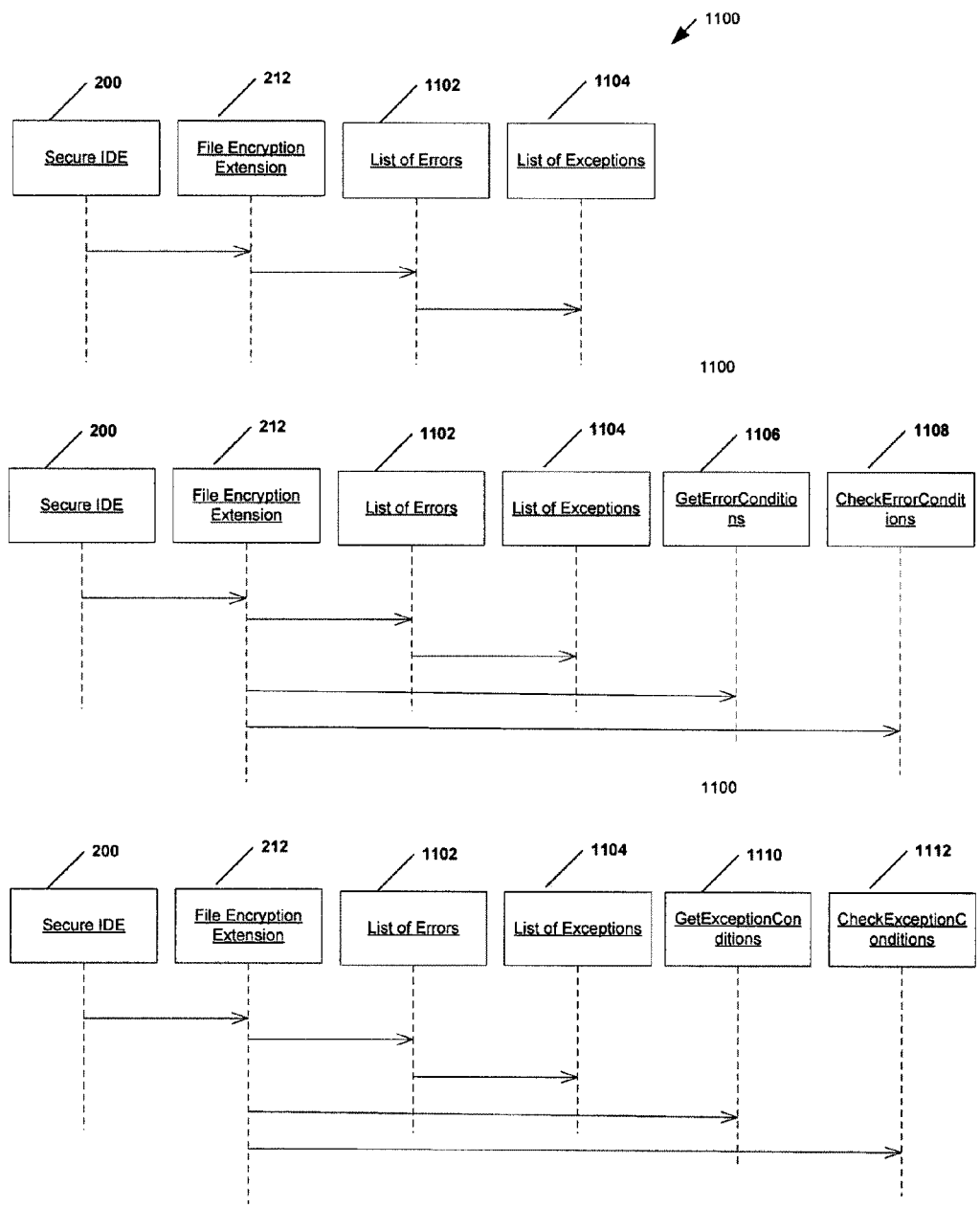
FIG. 11 illustrates an embodiment of a mechanism to eliminate or at least reduce a probability of security breach while performing transparent file encryption/decryption.

FIG. 11 illustrates an embodiment of a mechanism 1100 to eliminate or at least reduce a probability of security breach while performing transparent file encryption/decryption. In one embodiment, the probability of security breach is eliminated or at least reduced while performing transparent file encryption/decryption using one or more novel components of the secure IDE 200, such as a novel file encryption extension 212. At the novel secure IDE 200, using the novel file encryption extension 212, a list of errors 1102 and a list of unchecked exceptions 1104 are prepared. These errors 1102 and exceptions 1104 are those that are determined to potentially occur. Using the secure IDE 200 and its component, the file encryption extension 212, a pre-emptive check is performed to determine and check one or more novel error conditions 1106, 1108 that could trigger an error like the ones on the list of errors 1102. Similarly, using the secure IDE 200 and its component, the file encryption extension 212, a pre-emptive check is performed to determine and check one or more novel exception conditions 1110, 1112 that could trigger an exception like the ones on the list of exceptions 1104.

Figure 12:
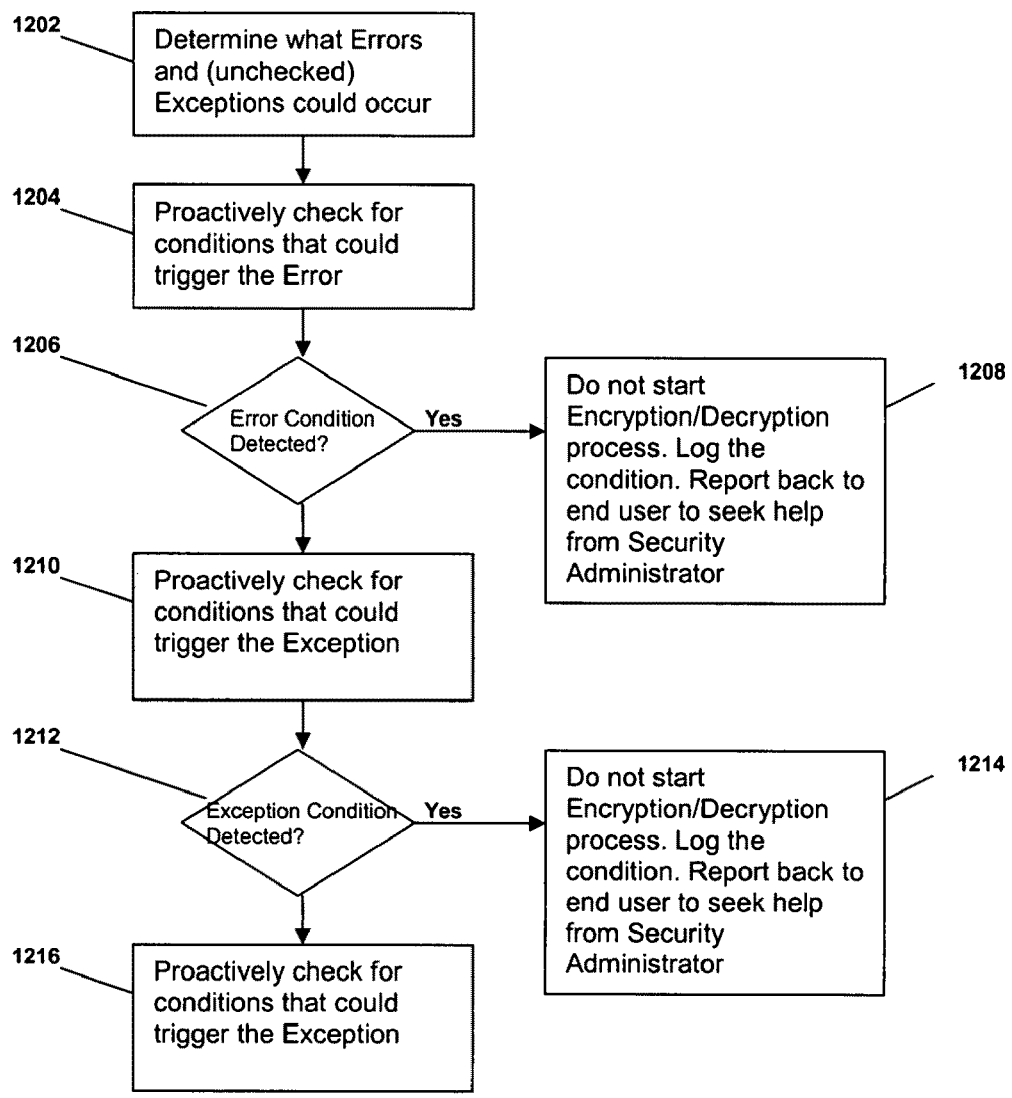
FIG. 12 illustrates an embodiment of a process to eliminate or at least reduce a probability of security breach while performing transparent file encryption/decryption.

FIG. 12 illustrates an embodiment of a process to reduce a probability of security breach while performing transparent file encryption/decryption. In one embodiment, the probability of security breach is reduced while performing transparent file encryption/decryption. At processing block 1202, any errors and unchecked exceptions that could occur are determined. At processing block 1204, a pre-emptive check is performed for a condition that could trigger such an error. At decision block 1206, a determination is made as to whether such an error condition exists. If the error condition is detected, the encryption/decryption process is not started, and the error condition is logged and then reported to the end user to seek any necessary help from the security administrator at processing block 1208. If the error condition is not detected, a pre-emptive check is performed for a condition that could trigger each unchecked exception at processing block 1210. At decision block 1212, a determination is made as to whether such an exception condition exists. At processing block 1214, if the exception condition is detected, the encryption/decryption process is not started, and the exception condition is logged and then reported to the end user to seek any necessary help from the security administrator. If the exception condition is not detected, the encryption/detection process is started at processing block 1216.

In one embodiment, when source code file encryption and decryption is transparently being carried out at the infrastructure (or platform) level of a secure IDE that is designed to hide the plain text files from an end user (because the end users could be deemed un-trusted or unauthorized), then the automation of recovery from exceptions encountered during the source code file encryption/decryption phase is used to avoid a security breach. The exception handling approach at the infrastructure (or platform) level is different from the case where an end user were to manually initiate an encryption/decryption process on a specified file because the number of checks and balances that can be dynamically applied while performing a manual process is relatively higher than what can be put into a static algorithm. More importantly, in one case, the end user is deemed trusted and in the other, the end user is not. Therefore, the system is equipped with a secure IDE and its relevant components/extensions to handle encryption/decryption related exceptions correctly and promptly, so that a security breach is avoided. In one embodiment, a novel file encryption/decryption extension of a secure IDE such as the one illustrated in FIGS. 2 and 3 is used to provide techniques for eliminating or at least reducing the probability of secure breach while performing transparent file encryption/decryption.

With automated exception handling, using the novel file encryption/decryption extension, the avoidance of exceptions is maximized using proactive techniques that are themselves reliable, e.g., do not fail and/or recoverable, e.g., failures can be handled if they occur, and thereby minimizing the number of (encryption related) exception types that need to be handled in the first place. The technique ensures that the remaining checked (encryption related) exception types have a relatively low rate of occurrence.

In cases where recovery from (encryption related) checked exceptions is not possible, the file being encrypted or decrypted must be rolled back to its original state. There are serious security lapses that will result from improper rollback. In the case of a file being decrypted, portions of the decrypted text may become exposed. In the case of a file being encrypted, portions of the unencrypted file may become exposed. In either case, a security breach has occurred because unencrypted text has become exposed to an untrusted user. The message relayed back to an untrusted user is designed so as to not give away any trade secrets or compromise the secured system in any way whatsoever. In one embodiment, reducing a probability of a security breach is performed, while or prior to performing file encryption (e.g., transparent file encryption) and/or file decryption (e.g., transparent file decryption). The reducing of the probability of the security breach is performed to avoid unrecoverable exceptions and/or recover from exceptions whose likelihood of occurrence is relatively low and further, a rollback of any relevant sensitive information is performed if an exception occurs.

Using Certificate Expiry to Restrict Indefinite IDE Use

Figure 13:
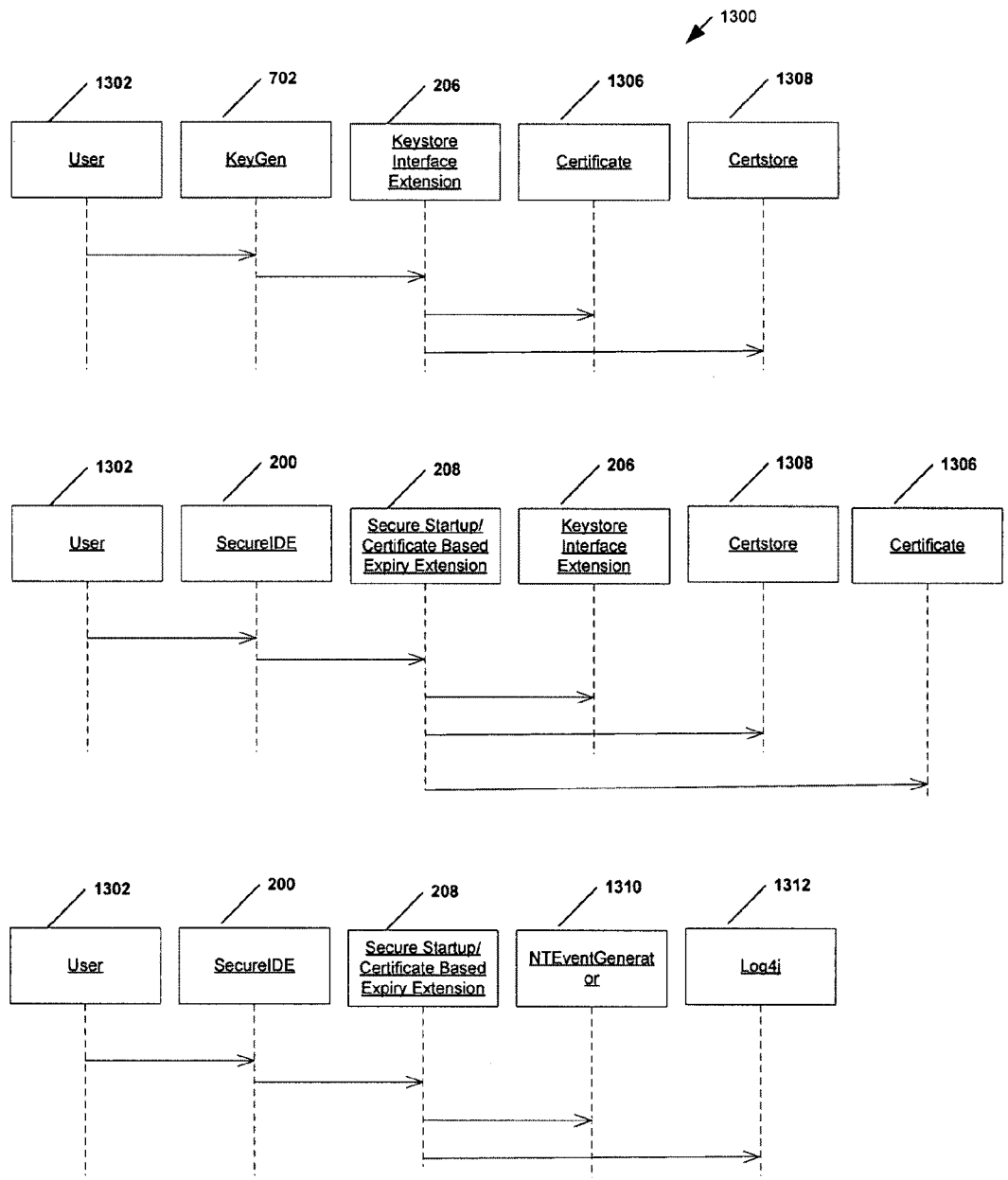
FIG. 13 illustrates an embodiment of a mechanism to perform timed product expiry using certificates.

FIG. 13 illustrates an embodiment of a mechanism 1300 to perform timed product expiry using certificates. In one embodiment, using the mechanism 1300, timed product expiry is performed using certificates via various novel components, such as key generator 702, keystore interface extension 206, and secure startup/certificate based expiry extension 208, of a secure IDE 200 as described with reference of FIGS. 2 and 3. The key pair generator 702 includes a module or a utility program and is part of one or more security extensions (e.g., file encryption extension 212) of the secure IDE 200. The key pair generator 702 may be used to generate file encryption keys. A certificate 1306 for a secure IDE installation (such as the secure IDE installation 300 of FIG. 3) is created using a control module utility and the key generator 702 and keystore interface extension 206. The certificate 1306 is placed at a certificate store 1308 (certstore). The certificate store 1308 may reside at a database associated with the secure IDE 200 and/or secure IDE installation 300. This function can be performed by a user 1302, such as a security administrator. Also, a timeout period and a keystore password are specified and may be verified. Then, the secure IDE 200 is stared by the user 1302, while the secure IDE 200, via the secure startup/certificate based expiry extension 208 and keystore interface extension 206, checks the certificate store 1306 for an expiry date, and a determination is made as to whether the expiry date is past or has passed. If the expiry date is past or has passed, an error message is displayed, the issue is logged, and a security alert event is generated using an event generator 1310 (e.g., NTEventGenerator) and Log4j 1312, and the process is aborted. If the expiry date is not past, the normal startup of the secure IDE continues.

Figure 14:
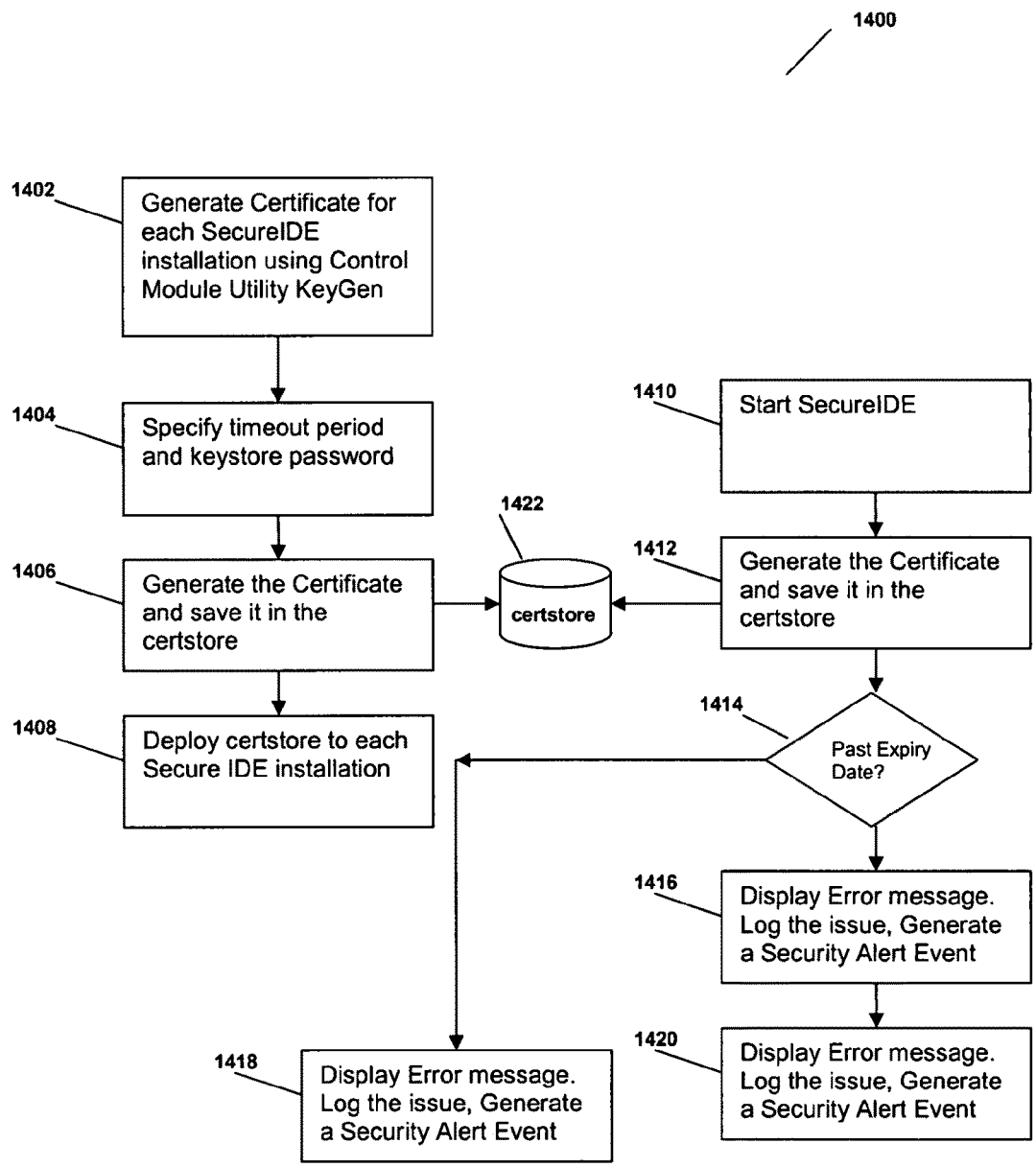
FIG. 14 illustrates an embodiment of a process to perform timed product expiry using certificates.

FIG. 14 illustrates an embodiment of a process to perform timed product expiry using certificates. In one embodiment, timed product expiry is performed using certificates. At processing block 1402, a certificate for a secure IDE installation (such as the secure IDE installation 300 of FIG. 3) is created using a control module utility and various novel components, such as a key generator, a keystore interface extension, and a secure startup/certificate based expiry extension, of a secure IDE as described with reference of FIG. 13. This can be performed by a security administrator. At processing block 1404, a timeout period and a keystore password are specified. At processing block 1406, a certificate is generated using a novel key generator, a novel keystore interface extension, and a novel secure startup/certificate based expiry extension, and the certificate is then saved in a certificate store 1422. At processing block 1408, the certificate store 1408 is deployed a part of the secure IDE 200 and/or secure IDE installation 300. The secure IDE is then started at processing block 1410, and the secure IDE checks the certificate store 1422 for expiry date at processing block 1412. At decision block 1414, a determination is made as to whether the expiry date is past or has passed. If the expiry date is past, an error message is displayed, the issue is logged, and a security alert event is generated at processing block 1416. The process is aborted at processing block 1420. If the expiry date is not past, the normal startup of the secure IDE continues at processing block 1418.

To keep a system secure and tamper-proof, certain primary components are protected. These components include runtime executable code that comprises the system binaries (and configuration files) and file encryption keys used by the runtime executable code (as described with reference to FIG. 3). Such tamper-proof systems are to have timeouts (or expiry) designed into them so as to minimize the window of opportunity for tampering should the system fall into the hands of a malicious party or unauthorized user. The implications of a timeout (or expiry) are different for a malicious party than for an authorized user. In the case of the malicious party, timeouts (or expiry) are used to make the system inoperable and that it remains so for any malicious or unauthorized user for as long as it takes. In the case of the authorized users (e.g., authorized administrators), recovering from a timeout (or expiry) is made as convenient and prompt as possible. Timeouts implemented at the key level may satisfy the first scenario, while timeouts implemented at the runtime executable code level may satisfy both scenarios.

Signing jar files using a certificate (with an expiry time) and enforcing the expiry by checking for the certificate timeout each time the system starts up is one example of implementing various embodiments of a secure IDE. This embodiment of the present invention is implemented in specific signed jar files that include various components (e.g., extensions) of a secured IDE as illustrated with reference to FIG. 3. In one embodiment, timed product expiry is performed. The process of timed produce expiry includes generating certificates with expiry times that obviate the need for decryption and/or re-encryption of secured source code.

Protection of Sensitive Build Logic

Figure 15:
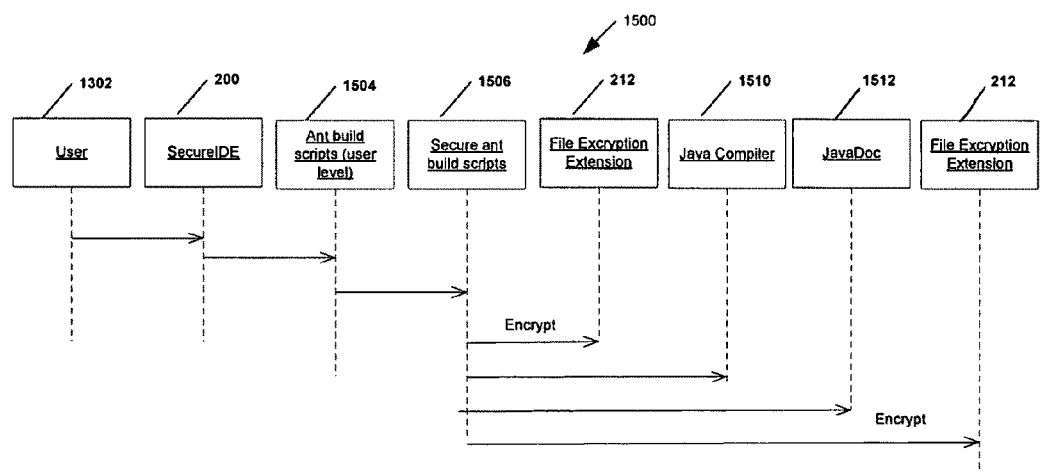
FIG. 15 illustrates an embodiment of a mechanism to secure reuse of sensitive build logic.

FIG. 15 illustrates an embodiment of a mechanism 1500 to secure reuse of sensitive build logic. In one embodiment, using the mechanism 1500; securing reuse of sensitive build logic is performed using a secure IDE 200 and its various components/extensions, such as a novel secure build security extension 210 as illustrated with reference to FIGS. 2 and 3. The secure IDE 200 is started and a build project is selected by a user 1502 (e.g., developer). The build project is triggered by, for example, the user 1502 clicking on the build project, while the secure IDE 200 invokes user level ant build scripts 1504. Each of the user level ant build scripts 1504 includes a secure build script 1506. In addition to the novel secure build security extension of the secure IDE 200, an encrypter 1508 (e.g., Java®-based file encrypter), a decryptor 1514 (e.g., Java®-based file decryptor, a compiler 1510 (e.g., Java compiler), and a document 1512 (e.g., JavaDoc) are employed to perform the technique of securing reuse sensitive build logic. It is contemplated that aforementioned components are not limited to being Java®-based, but that the Java®-based components are merely used here as examples and for brevity and clarity. The decryptor 1514 is invoked, and a determination is made as to whether an error has occurred. If an error has not occurred, the compiler 1510 and the JavaDoc 1512 are invoked and then, the encrypter 1508 is also invoked. If an error has not occurred, the process is rolled backed and aborted.

Figure 16:
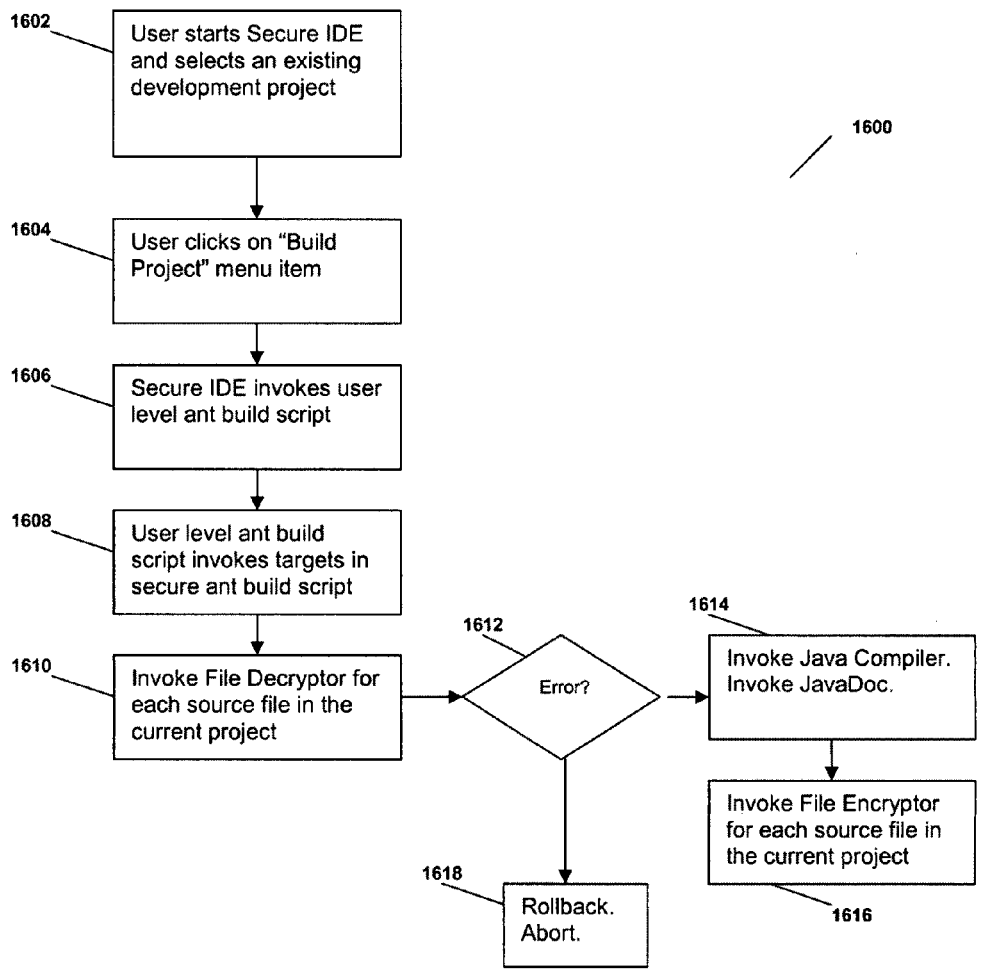
FIG. 16 illustrates an embodiment of a process to secure reuse of sensitive build logic.

FIG. 16 illustrates an embodiment of a process to secure reuse of sensitive build logic. In one embodiment, securing reuse of sensitive build logic is performed. At processing block 1602, a secure IDE is started and a build project is selected by a user. At processing block 1604, the build project is triggered by, for example, the user clicking on the build project. At processing block 1606, the secure IDE invokes a user level ant build script. At processing block 1608, the user level ant build script includes a secure build script. A decryptor (e.g., Java® based file decryptor) is invoked at processing block 1610. At decision block 1612, a determination is made as to whether an error has occurred. If an error has not occurred, a compiler (e.g., Java® compiler), a JavaDoc, etc., are invoked at processing block 1614 and then, an encrypter (e.g., Java® based file encrypter) is invoked at processing block 1616. If an error has not occurred, the process is rolled backed and aborted at processing block 1618.

In one embodiment, a re-fabricated secure (ant based) build targets are made available in a modular fashion to users so that any build script(s) created by the user can reuse (leverage) the secured build target by extending the logic without compromising the underlying implementation details of how the secured build target works. Also, the user can execute the build target and/or extend (i.e., add functionality to) it but may not modify, disable, delete, reverse engineer, or tamper with the original build target. This embodiment of the present invention is implemented in secured build scripts and signed jar files that comprise a secure IDE 200 having a secure build extension as illustrated in FIG. 3. In one embodiment, secure reuse of sensitive build logic is performed. The process of secure reuse of sensitive build logic includes separating out an ant based target into a file (e.g., Extensible Markup Language (XML) header file) and calling classes (e.g., Java® classes) containing sensitive encryption/decryption logic wherein the user is granted include-only or read-only access to the file (e.g., XML header file) to enable the secure reuse by un-trusted or unauthorized developers.

A VM is an example of a runtime system. A VM refers town abstract Machine that includes an instruction set, a set of registers, a stack, a heap, and a method area, such as a machine or processor. A VM essentially acts as an interface between program code and the actual processor or hardware platform on which the program code is to be executed. The program code includes instructions from the VM instruction set that manipulates the resources of the VM. The VM executes instructions On the processor or hardware platform on which the VM is running, and manipulates the resources of that processor or hardware platform, so as to effect the instructions of the program code. For example, a Java® source program can be compiled into program code, such as bytecode. Bytecode can be executed on a VM, such as a JVM, running on any processor or platform. The JVM can either interpret the bytecode one instruction at a time, or the bytecode can be further compiled for the real processor or platform using a just-in-time (JIT) compiler. For simplicity and brevity, the discussion in this document focuses on Java®-related components and virtual machines, etc., but it is to be understood that the techniques described herein can also be used with other types of programming languages and runtime systems.

Furthermore, the host account 308 having the secure IDE 200 may reside on a server including Java®-based application server that supports NetBeans components, Enterprise Java Bean ("EJB") components, EJB containers, Servlets, and Java Server Pages ("JSP"), etc. However, it is understood that processes taught by the discussion above can be practiced with various programming languages and runtime systems and within various software environments such as, for example, object-oriented and non-object-oriented programming environments, Java based environments, and other environments (e.g., a .NET environment, a Windows/NT environment each provided by Microsoft® Corporation), and the like.

Processes taught by the discussion above may be performed with program code, such as machine-executable instructions, which can cause a machine (such as a "virtual machine", a general-purpose processor disposed on a semiconductor chip, a special-purpose processor disposed on a semiconductor chip, etc.) to perform certain functions. Alternatively, these functions may be performed by specific hardware components that contain hardwired logic for performing the functions, or by any combination of programmed computer components and custom hardware components.

One or more modules, components, or elements described throughout this document, such as the ones shown within or associated with the secure IDE 200 of FIG. 2 or the secure IDE installation 300 of FIG. 3, may include hardware, software, and/or a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared, signals, digital signals, etc.), etc. The machine accessible medium may further include an electronic device having code loaded on a storage that may be executed when the electronic device is in operation. Thus, delivering an electronic device with such Code may be understood as providing the article of manufacture with such content described above. Furthermore, storing code on a database or other memory location and offering the code for download over a communication medium via a propagated signal may be understood as providing the article of manufacture with such content described above. The code may also be downloaded from a remote computer (e.g., a server) to a requesting computer (e.g., a client) by way of data signals embodied in a propagation medium (e.g., via a communication link (e.g., a network connection)).

Figure 17:
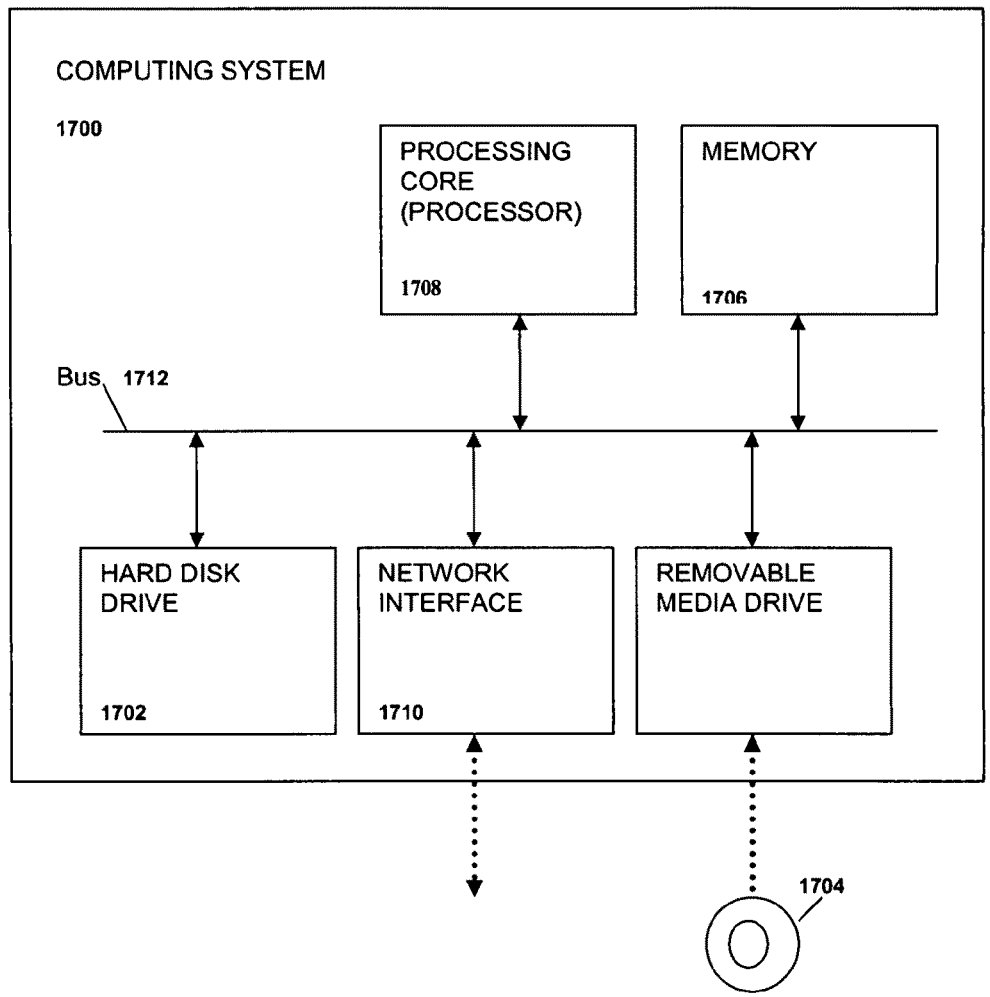
FIG. 17 illustrates an embodiment of a computing system.

FIG. 17 illustrates an embodiment of a computing system 1700. Computing system 1700 may be used for implementing one or more embodiments of the present invention and for executing program code stored by an article of manufacture. It is important to recognize that the computing system 1700 represents merely of various computing system architectures that can be used for the same purposes. The applicable article of manufacture may include one or more fixed components (such as hard disk drive 1702 or memory 1706) and/or various movable components, such as compact disk (CD) ROM 1704, a compact disc, a magnetic tape, and the like. To execute the program code, typically instructions of the program code are loaded into RAM 1706. Then, processing core 1708 executes the instructions. A processing core may include one or more processors and a memory controller function. A virtual machine or "interpreter" (e.g., JVM) may run on top of the processing core (architecturally speaking) to convert abstract code (e.g. Java® bytecode) into instructions that are understandable to the specific processor(s) of processing core 1708. Computing system 1700 further includes network interface 1710 and bus 1712 to connect to other systems via a network and to have various components communicate with each other, respectively.

Figure 18:
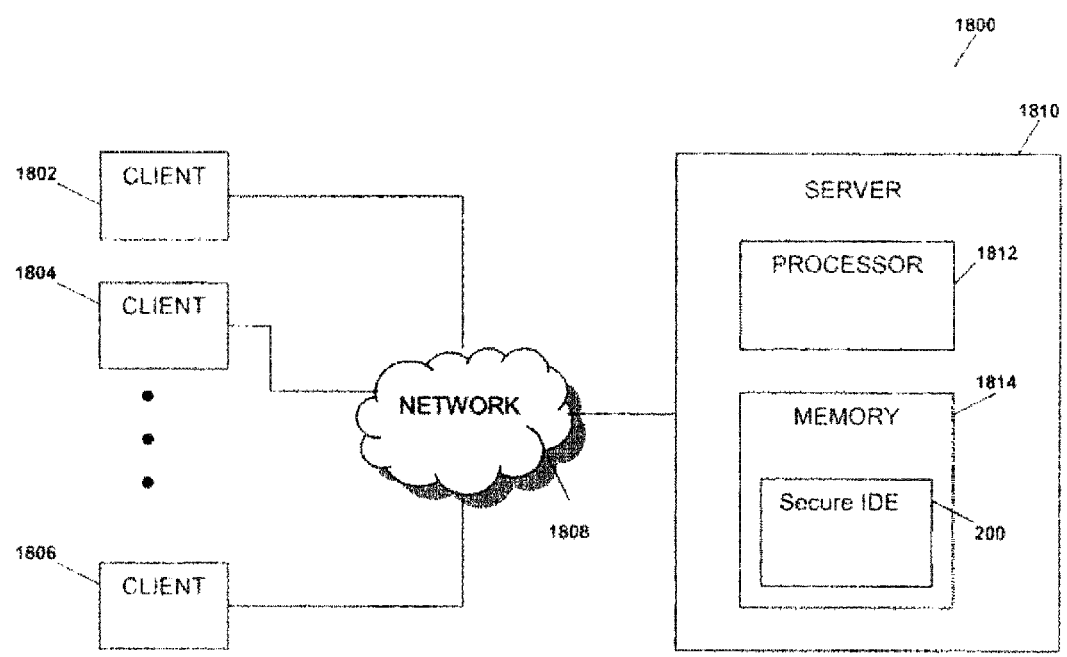
FIG. 18 illustrates an embodiment of a client/server network system employing an embodiment of a secure IDE.

FIG. 18 illustrates an embodiment of a client/server network system 1800 employing an embodiment of a secure IDE 200. As illustrated, network 1808 links server 1810 with client systems 1802-1806. Server 1810 includes programming data processing system suitable for implementing apparatus, programs, and/or methods in accordance with one or more embodiments of the present invention. Server 1810 includes processor 1812 and memory 1814. Server 1810 provides a core operating environment for one or more runtime systems (e.g., VM) at memory 1814 to process user requests. Memory 1814 may include a shared memory area that is accessible by multiple operating system processes executing in server 1810. An enterprise server at memory 1814 may host an embodiment of the secure IDE 200 of FIGS. 2 and 3. A number of VMs at memory 1814 may be used to store, maintain, and run the secure IDE 200 as well as to run other processes (such as processes 310 illustrated with respect to FIG. 3). Memory 1814 can also be used to store an operating system, a Transmission Control Protocol/Internet Protocol (TCP/IP) stack for communicating over network 1808, and machine executable instructions executed by processor 1812. In some embodiments, server 1810 may include multiple processors, each of which can be used to execute machine executable instructions.

Client systems 1802-1806 may execute multiple application or application interfaces. Each instance or application or application interface may constitute a user session. Each user session may generate one or more requests to be processed by server 1810. The requests may include instructions or code to be executed on a runtime system, such as a VM, on server 1810, such as the requests made via the secure IDE 200 and its components and modules (e.g., extensions 204-214) as described throughout this document.

In addition to what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What I claim is:
1. A computer-implemented method comprising:
 identifying one or more modules associated with a conventional integrated development environment (IDE) that are to be modified to transform the conventional IDE into a secure IDE, wherein each of the one or more modules corresponds to an IDE component;

determining one or more security extensions to be associated with the one or more modules that are chosen to be modified based on their corresponding one or more IDE components; and generating the secure IDE by modifying the one or more modules by associating a security extension to each IDE component corresponding to each of the one or more modules to transform each IDE component into a secure IDE component to transform the conventional IDE into the secure IDE, wherein the secure IDE provides security for one or more software applications that are developed using the secure IDE.

2. The computer-implemented method of claim 1, wherein the one or more security extensions comprise at least one of a secure cut/copy/paste security extension, a secure keystore interface security extension, a secure startup/certificate based expiry security extension, a secure build security extension, a secure file encryption/decryption security extension, or a secure intrusion detection security extension.

3. The computer-implemented method of claim 1, further comprising securely transferring a conventional source code associated with the conventional IDE or a secure source code associated with the secure IDE over an unsecured network, wherein securely transferring comprises:

generating a public/private key pair at a first location, the public/private key having a public key and a private key;

transmitting the public key to a second location;

generating an encryption key, encrypting the source code via the encryption key, and encrypting the encryption key via the public key at the second location;

transmitting the encrypted encryption key and the encrypted source code to the first location;

receiving the encrypted encryption key and the encrypted source code at the first location; and decrypting the encrypted encryption key via the private key, and decrypting the encrypted source code via the encryption key at the first location.

4. The computer-implemented method of claim 1, further comprising detecting security intrusion in a programming method that performs one or more of an encryption operation and a decryption operation, the programming method including a Java method, the detecting of the security intrusion in the programming method including generating and analyzing of stack trace information to detect intrusion and generate a security alert event, the detecting of the security intrusion in the programming method further including:

receiving an incoming call;

detecting stack trace of the incoming call;

generating the stack trace information associated with the stack trace of the incoming call;

analyzing the stack trace information to determine whether a caller is authorized or unauthorized;

generating the security alert event, if the caller is unauthorized; and allowing the call to proceed, if the caller is authorized.

5. The computer-implemented method of claim 1, further comprising managing a probability of a security breach associated with performing one or more of a file encryption process and a file decryption process, the managing of the probability including eliminating the probability of the security breach or reducing the probability of the security breach, the managing of the probability further including:

preemptively detecting error conditions that are associated with triggering one or more errors;

preemptively detecting exception conditions that are associated with triggering one or more exceptions;

forbidding the file encryption process or the file decryption process from being performed, if one or more of the error conditions and the exception conditions are detected, the forbidding of the encryption and decryption processes from being performed including rolling back sensitive information to be secured; and allowing the file encryption process or the file decryption process to proceed, if the one or more of the error conditions and the exception conditions are not detected.

6. The computer-implemented method of claim 1, further comprising performing timed product expiry, the performing of the timed product expiry including generating one or more certificates with expiry times to obviate decrypting or re-encrypting of the secure source code of the secure IDE, the performing of the timed product expiry further including:

generating the one or more certificates associated with one or more portions of the secure source code of the secure IDE;

assigning an expiry time period to each of the one or more certificates, the assigning of the expiry time period including assigning a password to the one or more certificates, the password including a keystore password;

storing the one or more certificates at a database;

checking the one or more certificates and the corresponding expiry time periods prior to starting the secure IDE;

generating a security alert event, if the one or more certificates have expired, the generating of the security alert event including displaying an error via a display device; and allowing the starting of the secure IDE to proceed, if the one or more certificates have not expired.

7. The computer-implemented method of claim 1, further comprising securing reuse of sensitive build logic, the securing reuse of the sensitive build logic including separating out ant based targets into a file, the file including an Extensive Markup Language (XML) file, and calling classes containing sensitive encryption/decryption logic, the classes including Java classes, and granting read-only access to the XML file to enable the securing reuse of the sensitive build logic, the securing reuse of the sensitive build logic further including:

starting the secure IDE, and selecting a project;

invoking a user level ant based script, the user level ant based script having a secure build script;

invoking a file decryptor to perform decryption;

invoking a compiler, or an encrypter to perform encryption, if an error has not occurred; and aborting a process for using the secure IDE, if the error has occurred, wherein aborting of the process including rolling back sensitive information to be secured.

8. A system comprising:

a computer server having a mechanism for transforming a conventional integrated development environment (IDE) into a secure IDE, the computer server further having one or more virtual machines to provide a runtime system for running the mechanism, the conventional IDE, or the secure IDE, the mechanism to:

identify one or more modules associated with the conventional IDE that are to be modified to transform the conventional IDE into a secure IDE, wherein each of the one or more modules corresponds to an IDE component;

determine one or more security extensions to be associated with the one or more modules that are chosen to be modified based on their corresponding one or more IDE components; and generate the secure IDE by modifying the one or more modules by associating a security extension to each IDE component corresponding to each of the one or more modules to transform each IDE component into a secure IDE component to transform the conventional IDE into the secure IDE, wherein the secure IDE provides security for one or more software applications that are developed using the secure IDE.

9. The system of claim 8, wherein the one or more security extensions comprise at least one of a secure cut/copy/paste security extension, a secure keystore interface security extension, a secure startup/certificate based expiry security extension, a secure build security extension, a secure file encryption/decryption security extension, or a secure intrusion detection security extension.

10. A non-transitory machine-accessible medium having instructions which, when executed, cause a machine to:
identify one or more modules associated with a conventional integrated development environment (IDE) that are to be modified to transform the conventional IDE into a secure IDE, wherein each of the one or more modules corresponds to an IDE component;
determine one or more security extensions to be associated with the one or more modules that are chosen to be modified based on their corresponding one or more IDE components; and
generate the secure IDE by modifying the one or more modules by associating a security extension to each IDE component corresponding to each of the one or more modules to transform each IDE component into a secure IDE component to transform the conventional IDE into the secure IDE, wherein the secure IDE provides security for one or more software applications that are developed using the secure IDE.

11. The non-transitory machine-accessible medium of claim 10, wherein the one or more security extensions comprise at least one of a secure cut/copy/paste security extension, a secure keystore interface security extension, a secure startup/certificate based expiry security extension, a secure build security extension, a secure file encryption/decryption security extension, or a secure intrusion detection security extension.

12. A computer-implemented method comprising:
transforming a conventional intrusion detection component of a conventional integrated development environment (IDE) into a secure intrusion detection component to transform the conventional IDE into a secure IDE, wherein the conventional intrusion detection component is transformed by accepting an intrusion detection exception, wherein the secure IDE provides security for one or more software applications that are developed using the secure IDE;
detecting security intrusion in a programming method that performs an encryption operation or a decryption operation, wherein detecting includes generating and analyzing of stack trace information to detect intrusion and generate a security alert event, wherein detecting is performed to prevent an unauthorized access of the secure IDE and further includes:
receiving an incoming call;
detecting stack trace of the incoming call;
generating the stack trace information associated with the stack trace of the incoming call;
analyzing the stack trace information to determine whether a caller is authorized or unauthorized;
generating the security alert event, if the caller is unauthorized; and
allowing the call to proceed, if the caller is authorized, wherein the security alert event based on the secure intrusion detection component is used to determine whether the caller is authorized.

13. The computer-implemented method of claim 12, wherein detecting includes transforming one or more conventional IDE components associated with one or more modules of a conventional IDE source code into one or more secure IDE components by adding one or more security extensions to the one or more conventional IDE components, wherein the one or more secure IDE components include the secure intrusion detection security component or a secure pattern analyzer, wherein the programming method includes a Java method.

14. A computer-implemented method comprising:
transforming a conventional build security component of a conventional integrated development environment (IDE) into a secure build security component to transform the conventional IDE into a secure IDE, wherein the conventional build security component is transformed by accepting a build security exception, wherein the secure IDE provides security for one or more software applications that are developed using the secure IDE;
securing reuse of sensitive build logic using the secure build security component, the securing reuse of the sensitive build logic including separating out ant based targets into a file, and calling classes containing sensitive encryption/decryption logic, and granting read-only access to the file to enable the securing reuse of the sensitive build logic, the securing reuse of the sensitive build logic further including:
starting the secure IDE, and selecting a project;
invoking a user level ant based script, the user level ant based script having a secure build script;
invoking a file decryptor to perform decryption;
invoking a compiler, or an encrypter to perform encryption, if an error has not occurred; and
aborting a process for using the secure IDE, if the error has occurred, wherein aborting of the process including rolling back sensitive information to be secured.

15. The computer-implemented method of claim 14, wherein securing includes transforming one or more conventional IDE components associated with one or more modules of a conventional IDE source code into one or more secure IDE components by adding one or more security extensions to the one or more conventional IDE components, wherein the one or more secure IDE components include the secure build security component, wherein the file includes an Extensive Markup Language (XML) file.

16. The computer-implemented method of claim 1, wherein the one or more security extensions are associated with the one or more IDE components to transform the one or more IDE components into one or more secure IDE components, wherein the one or more secure IDE components comprise at least one of a secure cut/copy/paste security component, a secure keystore interface security component, a secure startup/certificate based expiry security component, a secure build security component, a secure file encryption/decryption security component, or a secure intrusion detection security component.

17. The computer-implemented method of claim 1, wherein generating further comprises adding one or more new secure IDE components to the conventional IDE components or the secure IDE components to transform the conventional IDE into the secure IDE.

18. The computer-implemented method of claim 1, wherein the secure IDE provides additional software development security over the conventional IDE without having to change software development methodologies or add to a minimum runtime performance overhead that are associated with the conventional IDE.

19. The computer-implemented method of claim 1, wherein the one or more modules are identified out of the conventional IDE source code.

20. The computer-implemented method of claim 1, wherein providing security comprises securing source code of the one or more software applications against one or more of unintentional editing, intentional or unintentional copying, and outside theft.

21. The system of claim 8, wherein the one or more security extensions are associated with the one or more IDE components to transform the one or more IDE components into one or more secure IDE components, wherein the one or more secure IDE components comprise at least one of a secure cut/copy/paste security component, a secure keystore interface security component, a secure startup/certificate based expiry security component, a secure build security component, a secure file encryption/decryption security component, or a secure intrusion detection security component.

22. The system of claim 8, wherein the mechanism is further to add one or more new secure IDE components to the conventional IDE components or the secure IDE components to transform the conventional IDE into the secure IDE.

23. The system of claim 8, wherein providing security comprises securing source code of the one or more software applications against one or more of unintentional editing, intentional or unintentional copying, and outside theft.

24. The non-transitory machine-readable medium of claim 10, wherein the one or more security extensions are associated with the one or more IDE components to transform the one or more IDE components into one or more secure IDE components, wherein the one or more secure IDE components comprise at least one of a secure cut/copy/paste security component, a secure keystore interface security component, a secure startup/certificate based expiry security component, a secure build security component, a secure file encryption/decryption security component, or a secure intrusion detection security component.

25. The non-transitory machine-readable medium of claim 10, wherein providing security comprises securing source code of the one or more software applications against one or more of unintentional editing, intentional or unintentional copying, and outside theft.

* * * * *